US012115783B2

(12) United States Patent
Weber et al.

(10) Patent No.: US 12,115,783 B2
(45) Date of Patent: Oct. 15, 2024

(54) PRINTING SYSTEM FOR GENERATING NOZZLE FIRING PATTERNS BASED ON POSITIONAL OFFSETS

(71) Applicant: The Boeing Company, Chicago, IL (US)

(72) Inventors: Tobias Weber, Augsburg (DE); Anthony Wayne Baker, Gilbertsville, PA (US); Matthew H. Mellin, Seattle, WA (US); Andreas Bartl, Munich (DE)

(73) Assignee: The Boeing Company, Arlington, VA (US)

( * ) Notice: Subject to any disclaimer, the term of this patent is extended or adjusted under 35 U.S.C. 154(b) by 40 days.

(21) Appl. No.: 17/662,602

(22) Filed: May 9, 2022

(65) Prior Publication Data

US 2022/0379600 A1 Dec. 1, 2022

Related U.S. Application Data

(60) Provisional application No. 63/202,115, filed on May 27, 2021.

(51) Int. Cl.
 *B41J 2/045* (2006.01)
 *B41J 2/135* (2006.01)
 *B41J 2/145* (2006.01)

(52) U.S. Cl.
 CPC .......... *B41J 2/04505* (2013.01); *B41J 2/135* (2013.01); *B41J 2/145* (2013.01)

(58) Field of Classification Search
 CPC ........ B41J 2/04505; B41J 2/135; B41J 2/145; B41J 3/4073; B41J 2/15; B41J 2/155; B41J 2/2135
 See application file for complete search history.

(56) References Cited

U.S. PATENT DOCUMENTS

| | | |
|---|---|---|
| 2005/0255249 A1 | 11/2005 | Schlatterbeck et al. |
| 2009/0040286 A1 | 2/2009 | Tan et al. |
| 2009/0160894 A1 | 6/2009 | Barnard et al. |
| 2011/0044556 A1 | 2/2011 | Swanson |
| 2013/0257984 A1 | 10/2013 | Beier et al. |
| 2016/0239727 A1 | 8/2016 | Trissel et al. |
| 2018/0201029 A1 | 7/2018 | Mathis |
| 2020/0269601 A1 | 8/2020 | Lewis et al. |
| 2020/0269602 A1 | 8/2020 | Lewis et al. |

OTHER PUBLICATIONS

European Patent Office, Extended European Search Report issued in European Application No. 22164851.2, Feb. 3, 2023, Germany, 24 pages.

*Primary Examiner* — Kristal Feggins
(74) *Attorney, Agent, or Firm* — Alleman Hall & Tuttle LLP

(57) ABSTRACT

A printing system is provided comprising a print head including a plurality of ink nozzles; an actuator configured to move the print head relative to a substrate; a print head position sensing system configured to detect an actual position of the print head relative to the substrate; and a controller. The controller is configured to: receive the actual position of the print head detected by the print head position sensing system corresponding to a target print head position; determine a positional offset between the actual position and the target print head position; generate a nozzle firing pattern based on the positional offset; and control the print head to print the nozzle firing pattern at the target print head position using the plurality of ink nozzles.

20 Claims, 19 Drawing Sheets

PRINTING SYSTEM FOR GENERATING NOZZLE FIRING PATTERNS BASED ON POSITIONAL OFFSETS

CROSS REFERENCE TO RELATED APPLICATIONS

This application claims priority to U.S. Provisional Patent Application Ser. No. 63/202,115, filed May 27, 2021, the entirety of which is hereby incorporated herein by reference for all purposes.

FIELD

The present disclosure generally relates to printing systems and methods for printing on a substrate. In particular, the disclosure relates to inkjet printing on large aircrafts to allow mixing of different colors to create complex liveries with an inkjet printer.

BACKGROUND

In current processes of painting liveries onto large aircraft, many steps are needed to mask, spray, cure, and unmask for each individual color. This process may take several days, which occupies a large paint hanger space and further delays delivery of an aircraft to an end customer or increases a downtime of an in-service aircraft getting repainted.

Inkjet printing allows for printing of even more complex liveries onto the large and curved surfaces of aircraft. However, moving the print head over large curved surfaces to create the intended images to be printed onto the aircraft requires accurate placement of the ink droplets. For example, an inkjet printer printing 400 dots per inch (DPI) requires placement of individual droplets within the accuracy of approximately ±800 µin. This is important for the use of subtractive color mixing with mixing of base colors adjacent to each other to create different colors visible to an observer.

In small-scale inkjet printing processes, such as a home printer, the position of the substrate relative to the print head is controlled to a high degree. The print head is controlled in a relatively stiff enclosure, the substrate is a flat surface, such as paper, that is incrementally moved relative to the print head. Such constraints allow for high accuracy in the placement of individual ink droplets onto the substrate to produce high resolution, multi-color images onto the paper.

On the other hand, printing systems for painting large substrates, such as an aircraft, may include large scale manipulators, which tend to have limited print accuracy and flexibility, and print defects can arise without adequate compensation for positional offsets caused by vibrations and inaccurate print controls.

SUMMARY

In view of the above, a printing system is provided comprising a print head including a plurality of ink nozzles; an actuator configured to move the print head relative to a substrate; a print head position sensing system configured to detect an actual position of the print head relative to the substrate; and a controller. The controller is configured to: receive the actual position of the print head detected by the print head position sensing system corresponding to a target print head position; determine a positional offset between the actual position and the target print head position; generate a nozzle firing pattern based on the positional offset; and control the print head to print the nozzle firing pattern at the target print head position using the plurality of ink nozzles.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

The features, functions, and advantages that have been discussed can be achieved independently in various embodiments or can be combined in yet other embodiments further details of which can be seen with reference to the following description and drawings.

DETAILED DESCRIPTION

Figure 1:
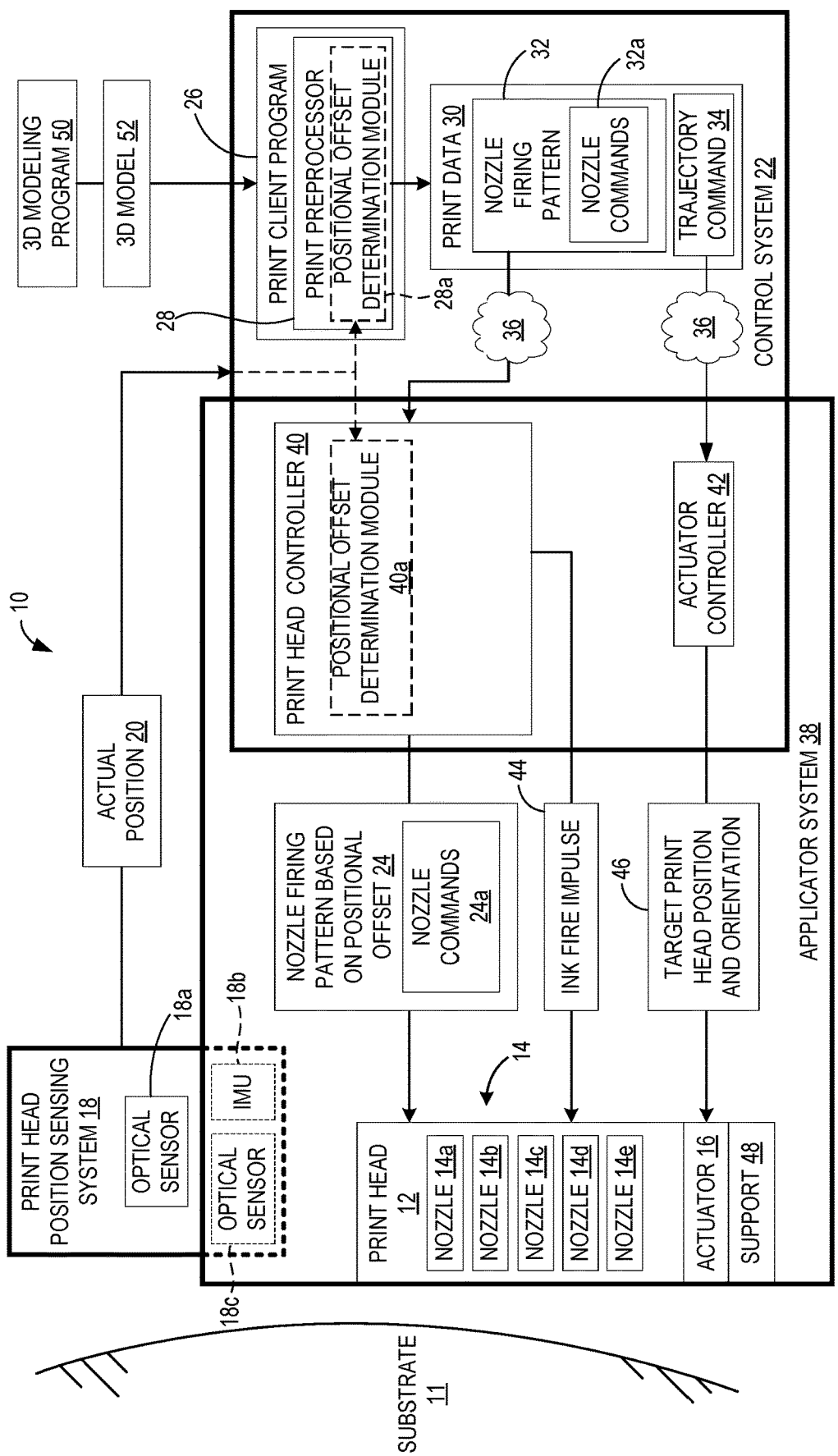
FIG. 1 is a general schematic diagram illustrating a printing system according to a first example embodiment of the subject disclosure.

In view of the above issues, as shown in FIG. 1, a printing system 10 is described in accordance with a first example embodiment of the present disclosure. The printing system 10 comprises a print head 12 including a plurality of ink nozzles 14; an actuator 16 configured to move the print head 12 relative to a substrate 11; a print head position sensing system 18 configured to detect an actual position 20 of the print head 12 relative to the substrate 11; and a controller 22 configured to: receive the actual position 20 of the print head 12 detected by the print head position sensing system 18 corresponding to a target print head position 46; determine a positional offset between the actual position 20 and the target print head position 46; generate a nozzle firing pattern 24 based on the positional offset; and control the print head 12 to print the nozzle firing pattern 32 at the target print head position 46 using the plurality of ink nozzles 14.

The print head position sensing system 18 can comprise an optical camera 18a. Additionally or alternatively, the print head position sensing system 18 can also include an optical camera 18c and an inertial measurement unit (IMU) 18b disposed on the print head 12.

In this embodiment, the controller 22 includes a print head controller 40 and an actuator controller 42. The controller 22 can include real-time and/or offline (asynchronous) controller components. The applicator system 38 includes the print head 12, print head controller 40, and the actuator controller 42. The print head 12 is mounted to an actuator 16. The print head 12 and the actuator 16 can be supported by a support 48. In this embodiment and subsequent embodiments, the support 48 can be, for example, a movable support framework including a gantry or a robotic manipulator, movements of which are controlled by the actuator controller 42. A 3D model 52 outputted by a 3D modeling program 50 is inputted into a print client program 26 executed by a real-time control component or an offline control component of the controller 22. The offline control component can be connected to the controller 22 by a communications link. The print client program 26 includes a print client preprocessor 28 which processes the inputted 3D model 52, then generates and outputs print data 30 including a trajectory command signal 34 and a nozzle firing pattern 32 comprising nozzle command signals 32a. The print client preprocessor 28 sends the trajectory command signal 34 to the actuator controller 42 via a communications link 36. In response, the actuator controller 42 controls the actuator 16 to move the print head 12 to print the nozzle firing pattern 32 at the target print head position 46 using the plurality of ink nozzles 14. The communications link 36 can take the form of network connection, bus, interconnect, or other direct or parallel serial data connection. The network connection can take the form of a local area network (LAN), wide area network (WAN), wired network, wireless network, personal area network, or a combination thereof, and can include the Internet. Although five ink nozzles 14a-e are depicted in FIG. 1, the number of ink nozzles in the print head 12 is not particularly limited.

The print client preprocessor 28 sends the nozzle firing pattern 32 including nozzle command signals 32a to the print head controller 40 via the communications link 36. A positional offset determination module 40a of the print head controller 40 can determine a positional offset between the actual position 20 and the target print head position 46, and generate a nozzle firing pattern 24 based on the positional offset. Alternatively, a positional offset determination module 28a of the print client preprocessor 28 can determine the positional offset between the actual position 20 and the target print head position 46, and generate the nozzle firing pattern 24 based on the positional offset. The print head controller 40 sends an ink fire impulse 44 to the ink nozzles 14 in control cycles, and sends the nozzle firing pattern 24 to the ink nozzles 14 synchronized with the control cycles at which the ink fire impulse 44 is sent.

Figure 2:
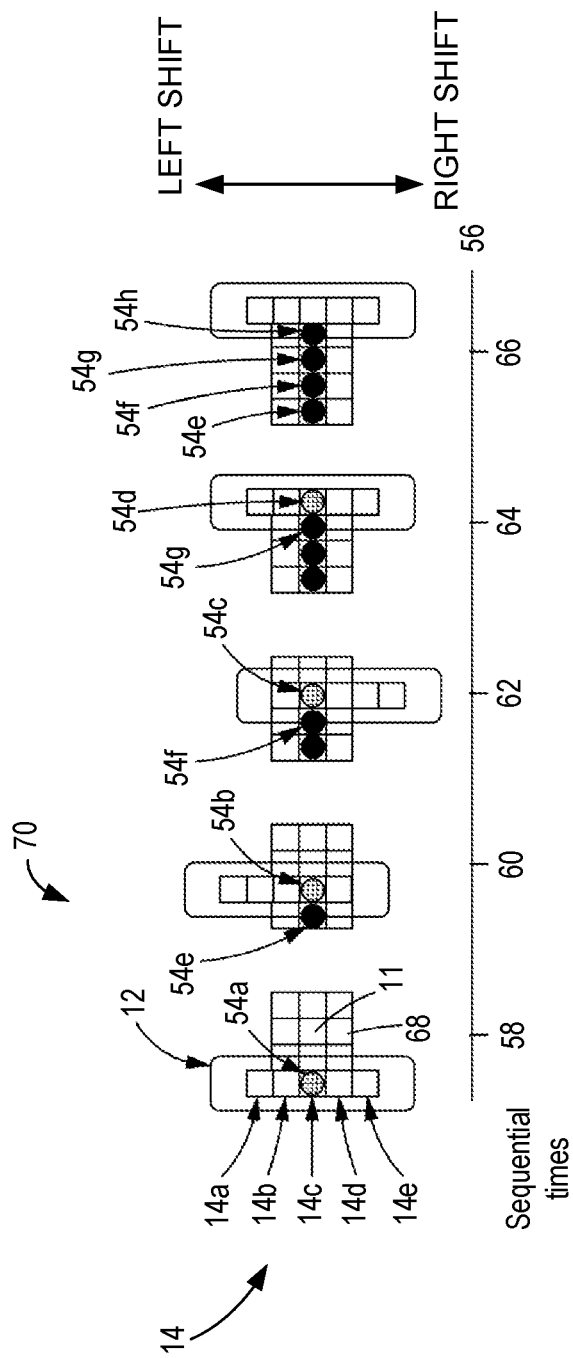
FIG. 2 is an illustration of print head printing on a substrate at various times according to the first example embodiment of the subject disclosure.

FIG. 2 illustrates a print head printing on a substrate at various times, in accordance with an embodiment of the present disclosure. In particular, FIG. 2 illustrates the sequential view 70 of the print head 12 at various sequential times (58-66) along the timeline 56. The print head 12 includes a plurality of ink nozzles 14a-e. The ink nozzles 14a-e are arranged in a linear array. The print head 12 is printing on the substrate 11, which is depicted with a grid 68 overlaid on top of the substrate 11. The grid 68 is shown for illustrative purposes and may not actually appear on the substrate 11. The desired image comprises the center row (running left to right as depicted in FIG. 2) of the grid 68 to receive ink droplets from the print head 12. An actuator 16 (not depicted) moves the print head 12 along the desired print head path. However, due to movements (e.g., vibrations), there may be a positional offset between an actual position of the print head 12 and the desired print head path at various times.

In the various depictions at times 58-66, a circle with dots indicates an ink droplet being deposited by the ink nozzle and a solid black circle indicates an ink droplet that has been deposited on the substrate 11 at a previous time.

At a first time 58, the print head 12 is centered above the grid 68. Thus, the ink nozzle 14c is aligned with the center row of the grid 68 and deposits the ink droplet 54a. At the second time 60, the print head 12 has advanced to the second column in the grid 68, and the print head 12 is triggered to deposit an ink droplet for the second column. However, at this time, the print head 12 is no longer centered above the grid 68. As such, the ink nozzle 14d is aligned with the center row that is intended to receive the ink droplet. At this second time 60, the ink droplet 54a from the first time 58 now appears as the ink droplet 54e (as a black circle) and the ink droplet 54b is being deposited onto the substrate 11.

At a third time 62, the print head 12 has now advanced to the third column of the grid 68, and is triggered to deposit an ink droplet for the third column. However, at this time, the print head 12 has shifted rightward relative to the substrate 11. As such, the ink nozzle 14b now deposits the ink droplet 54c onto the substrate. At a fourth time 64, the print head 12 is now centered above the grid 68, and the ink nozzle 14c deposits the ink droplet 54d.

At a fifth time 66, the print head 12 has completed printing four ink droplets along the center row of the grid 68 despite moving left to right relative to the grid 68 as it advanced along the desired print head path. Here, we can see the ink droplet 54e deposited as the ink droplet 54a at the first time 58, the ink droplet 54f deposited at the second time 60 as the ink droplet 54b, the ink droplet 54g deposited at the third time 62 as ink droplet 54*c*, and the ink droplet 54*h* deposited at the fourth time 64 as ink droplet 54*d*.

At each of the times 58-66, the controller 40 generated nozzle command signals 24*a* comprising the activation instructions to selectively activate the ink nozzles 14 to deposit the ink droplets 54*e*, 54*f*, 54*g*, and 54*h* on the substrate 11. The activation instructions selectively instruct the individual ink nozzles 14 to either deposit an ink droplet or not to deposit an ink droplet as the print head 12 passes each column of the grid 68.

Responsive to determining a positional offset between the actual position 20 of the print head 12 and the target print head position 46 in the desired print head path, the controller generates a nozzle firing pattern 24 based on the positional offset, which includes offset nozzle commands to linearly shift the activation instructions along the ink nozzles 14 along the linear array. Thus, when it is determined that the print head 12 has shifted leftward relative to the substrate 11 at the second time 60, the print head controller 40 sends to the print head 12 an offset nozzle command that linearly shifts the activation instructions along the linear array from the ink nozzle 14*c* to the ink nozzle 14*d*.

A similar, but opposite, offset and shift occurs at the third time 62 with the ink nozzle 14*b* depositing the ink droplet 54*c*. The print head controller 40 can also generate additional offset nozzle command signals 24*a* that linearly shift the activation instructions along the linear array by more than a single ink nozzle 14*a*. Such larger shifts can be selected for activation based on detecting a larger positional offset between the actual position 20 of the print head 12 and target print head position 46 in the desired print head path.

Figure 3:
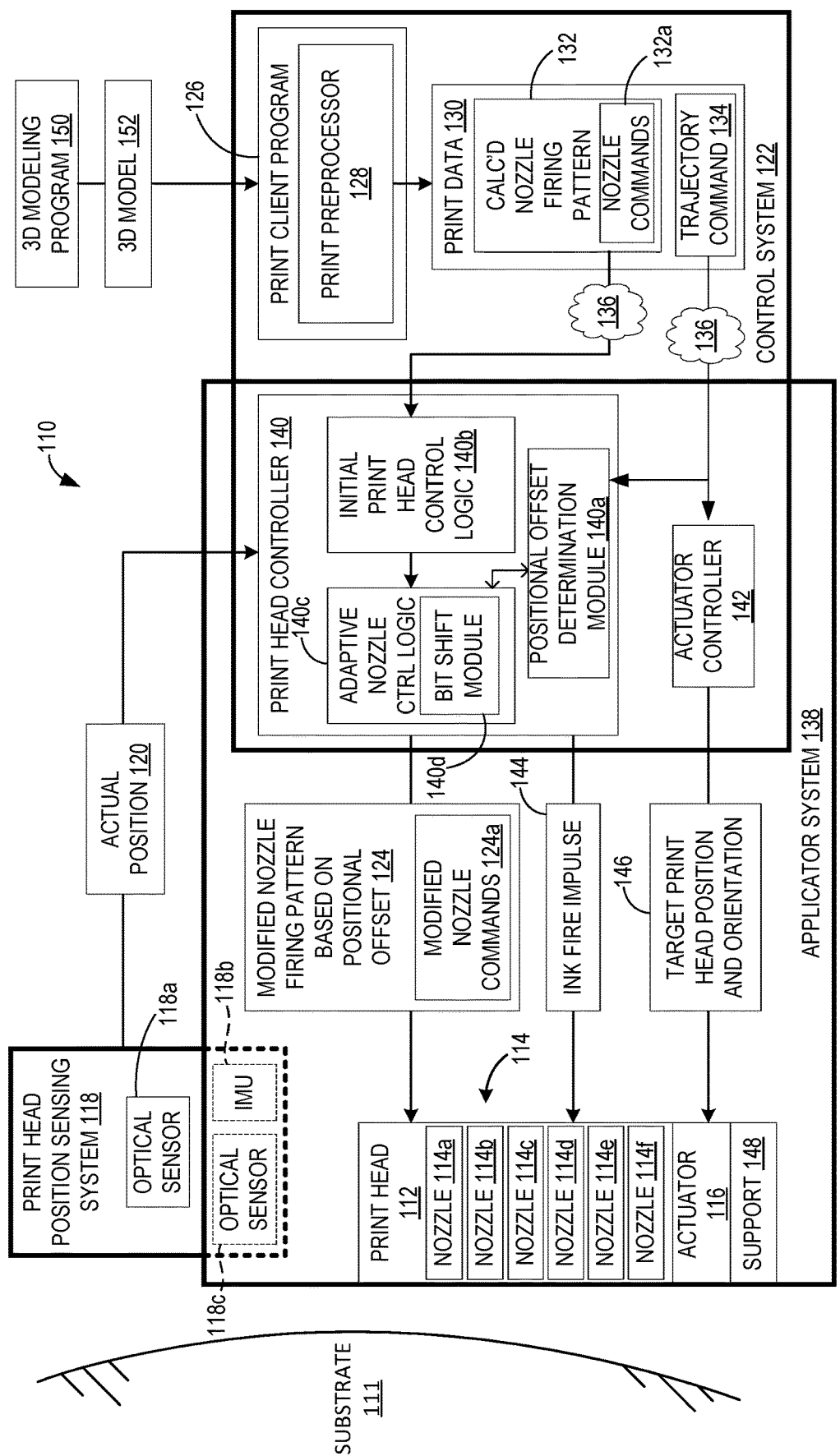
FIG. 3 is a general schematic diagram illustrating a printing system according to a second example embodiment of the subject disclosure.

Referring to FIG. 3, a printing system 110 is described in accordance with a second example embodiment of the present disclosure. The printing system 110 comprises a print head 112 including a plurality of ink nozzles 114; an actuator 116 configured to move the print head 112 relative to a substrate 111; a print head position sensing system 118 configured to detect an actual position 120 of the print head 112 relative to the substrate 111; and a controller 122 configured to: receive the actual position 120 of the print head 112 detected by the print head position sensing system 118 corresponding to a target print head position 146; determine a positional offset between the actual position 120 and the target print head position 146; and generate a nozzle firing pattern 124 based on the positional offset. The print head controller 140 is configured to send a nozzle command signal 124*a* to the print head 112 to trigger ink ejection of at least one of the plurality of ink nozzles 114 to control the print head 112 to print the nozzle firing pattern 132 at the target print head position 146 using the plurality of ink nozzles 114.

The print head position sensing system 118 can comprise an optical camera 118*a*. Additionally or alternatively, the print head position sensing system 118 can also include an optical camera 118*c* and an IMU 118*b* disposed on the print head 112. Although six ink nozzles 114*a-e* are depicted in FIG. 3, the number of ink nozzles in the print head 112 is not particularly limited.

The controller 122 includes a print head controller 140 and an actuator controller 142. The applicator system 138 includes the print head 112, print head controller 140, and the actuator controller 142. The print head 112 is mounted to an actuator 116. The print head 112 and the actuator 116 can be supported by a support 148. A 3D model 152 outputted by a 3D modeling program 150 is inputted into a print client program 126 executed by the controller 122. The print client program 126 can be executed on an offline control component that is connected to the controller 122 by a communications link. The print client program 126 includes a print client preprocessor 128 which processes the inputted 3D model 152, then generates and outputs print data 130 including a trajectory command signal 134 and a nozzle firing pattern 132 comprising nozzle command signals 132*a*. The print client preprocessor 128 sends the trajectory command signal 134 to the actuator controller 142 via a communications link 136. In response, the actuator controller 142 controls the actuator 116 to move the print head 112 to print the nozzle firing pattern 132 at the target print head position 146 using the plurality of ink nozzles 114.

The print head controller 140 is configured to generate the nozzle firing pattern 124 by, at least: intercepting the nozzle command signal 132*a*; and applying a bit-shift on the nozzle command signal 132*a* based at least on the determined positional offset to generate a bit-shifted nozzle command signal 124*a*. The print head controller 140 further controls the print head 112 to print the nozzle firing pattern 124 by, at least, sending the bit-shifted nozzle command signal 124*a* to the print head 112 to control the print head 112 to print the nozzle firing pattern 124 at the target print head position 146 using the plurality of ink nozzles 114.

The print client preprocessor 128 sends the nozzle firing pattern 132 including nozzle command signals 132*a* to the print head controller 140 via the communications link 136. The initial print head control logic 140*b* of the print head controller 140 receives the nozzle firing pattern 132 and relays the nozzle firing pattern to the adaptive nozzle control logic 140*c* of the print head controller 140. The adaptive nozzle control logic 140*c* includes a bit-shift module 140*d* which generates a modified nozzle firing pattern 124 based on a positional offset determined by the positional offset determination module 140*a* of the print head controller 140, which receives the actual position 120 of the print head 112 and subsequently determines the positional offset between the actual position 120 and the target print head position 146. The bit-shift module 140*d* applies a bit-shift on the nozzle command signal 132*a* based at least on the determined positional offset to generate a bit-shifted nozzle command signal 124*a*.

Figure 4:
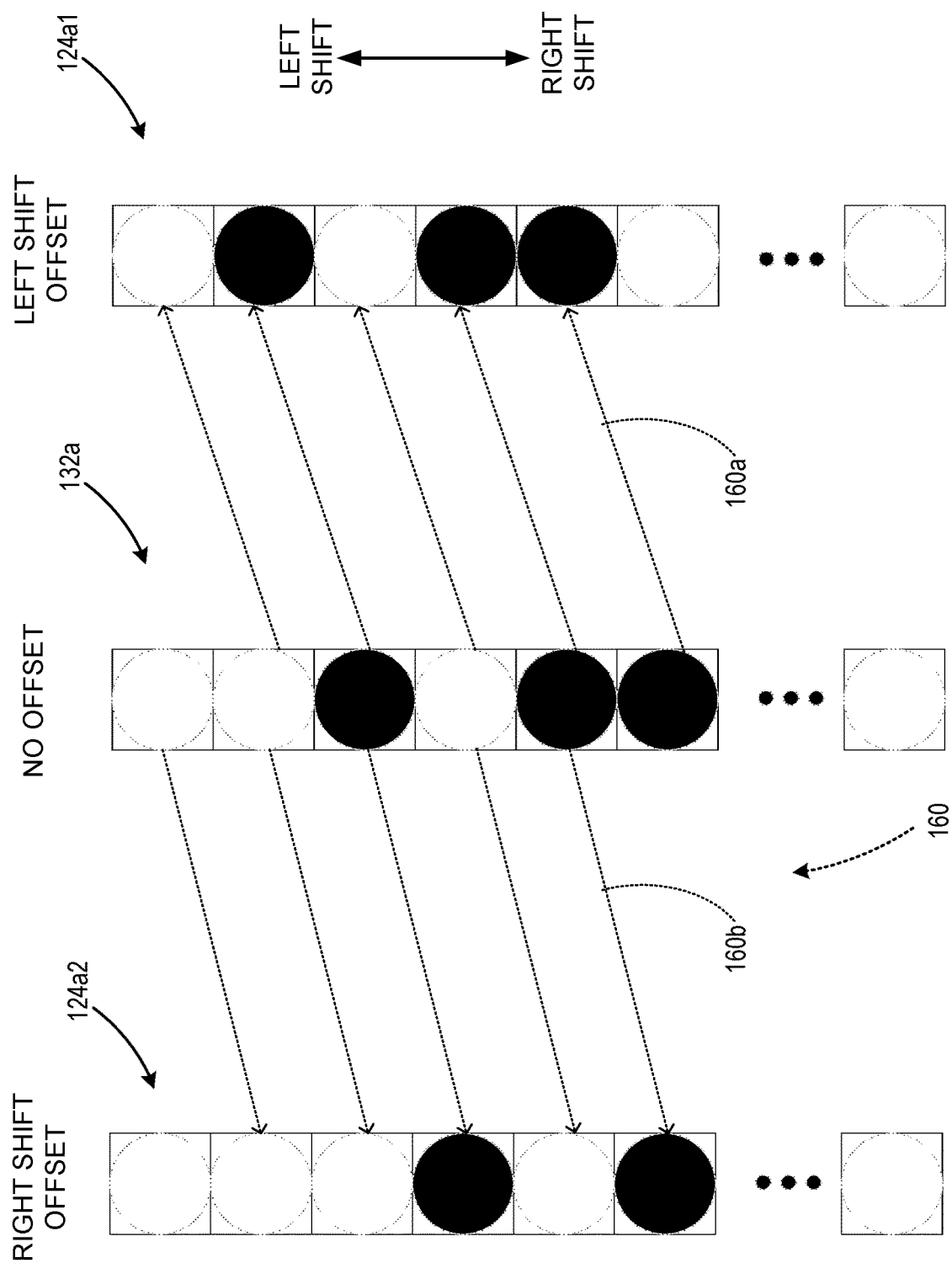
FIG. 4 is an illustration of the positional offsets which can be determined for the print head according to the second example embodiment of FIG. 3.

Referring to FIG. 4, the bit-shift module can apply a left shift offset 160*a*, a zero offset with no shifts to the nozzle command signals 132*a*, or a right shift offset 160*b*. In the left shift offset 160*a*, the bit pattern in the set of nozzle command signals 132*a* is shifted leftward relative to the print head 112 to compensate for the determined positional offset, and generate a set of leftwardly bit-shifted nozzle command signals 124*a*1. In the right shift offset 160*b*, the bit pattern in the set of nozzle command signals 132*a* is shifted rightward relative to the print head 112 to compensate for the determined positional offset, and generate a set of rightwardly bit-shifted nozzle command signals 124*a*2.

Figure 5:
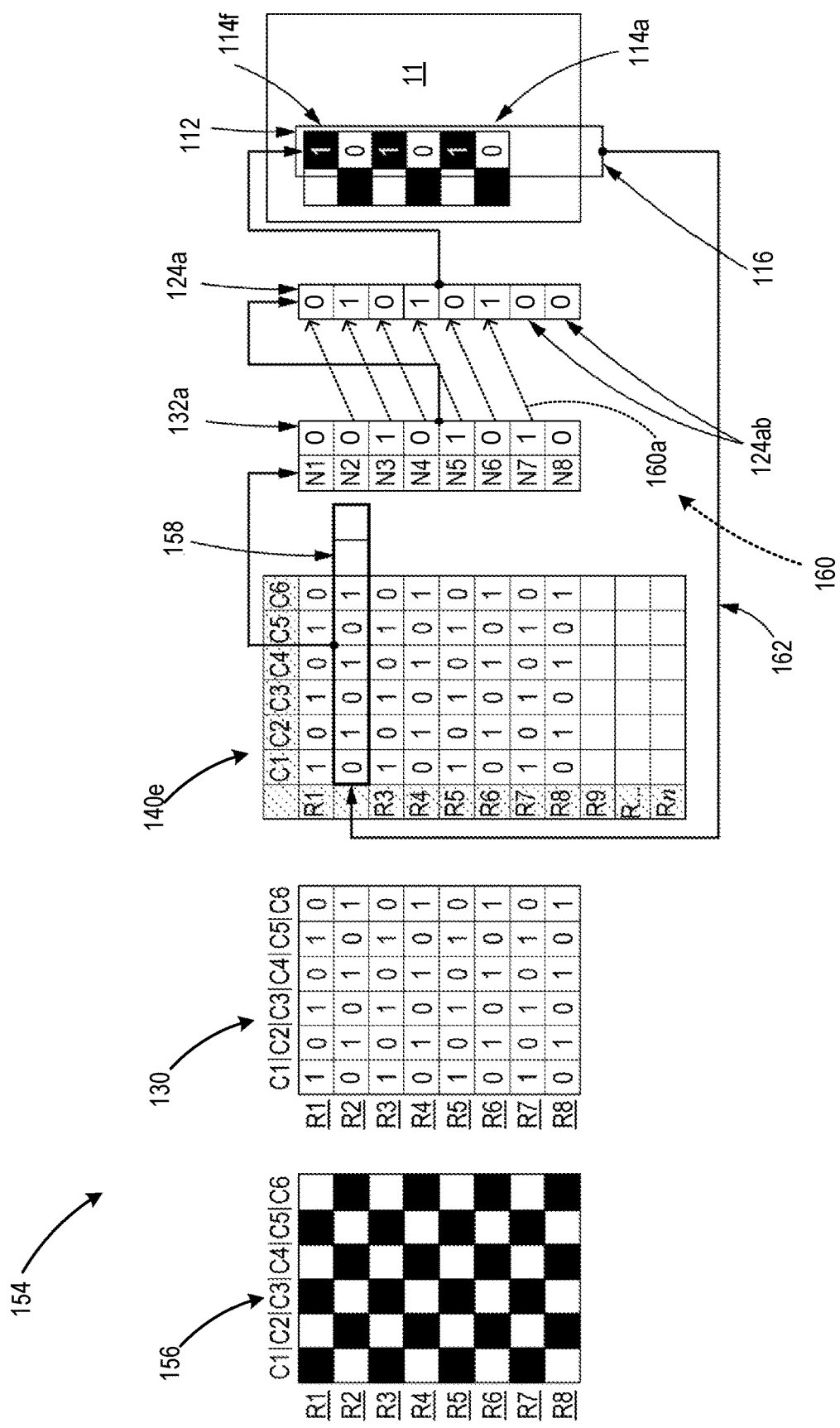
FIG. 5 is an illustration of a series of processes in printing according to the second example embodiment of FIG. 3.

FIG. 5 illustrates a series of processes in printing, in accordance with an embodiment of the present disclosure. In particular, FIG. 5 depicts the series 154 of processes in printing. The series 154 can be carried out by the printing system 110. Initial image data 156 included in the 3D model 152 can be an image which includes a plurality places where ink is to be deposited (where black squares are) and a plurality of places where ink is not to be deposited (where white squares are). The initial image data 156 can also indicate various columns and rows. The initial image data 156 can be processed and rasterized by the print client preprocessor 128 into print data 130, which can be a bitmap with a '1' indicating ink is to be deposited and a '0' indicating no ink is to be deposited.

Here, in column '1' (C1) and row '1' (R1), a black square is present, indicating ink is to be deposited to produce this portion of the image. In C2/R2, a white square is present, indicating that no ink is to be deposited there to produce this portion of the image. Thus, we can see for C1/R1 of the print data 130 of the black square, a '1' is represented in the bitmap of print data 130 for this location. Similarly, a '0' is represented for the white square of C1/R2 because it is represented by the white square in the initial image data 156. Other depicted images, bitmaps, and buffers disclosed throughout utilize similar conventions.

The print data 130 is stored in the buffer memory 140*e* of the print head controller 140. Responsive to the positional offset determination module 140*a* determining the positional offset, the bit-shift module 140*d* reads a data row 158 from the buffer memory 140*e*. The data row 158 corresponds to one set of nozzle command signals 132*a* for the ink nozzles 114 of the print head 112. The bit-shift module 140*d* applies a bit-shift 160 on the set of nozzle command signals 132*a* based on the determined positional offset to generate a set of bit-shifted nozzle command signals 124*a*, which are transferred to memory of the print head 112 to activate the ink nozzles 114 to deposit ink on the substrate 111. In this example, the bit-shift 160 applied on the set of nozzle command signals 132*a* is a left shift offset 160*a*. The bit-shift 160 shifts the bit pattern in the data row 158 by the number of bits corresponding to the determined positional offset. The vacant bit positions are filled with non-activation instructions 124*ab*.

The actuator 116 moves the print head 112 relative to the substrate 111 along the desired print head path. Here, the print head 112 includes six ink nozzles 114. For clarity, only ink nozzle 114*a*, depicted at the bottom of the linear array of the print head 112, and the ink nozzle 114*f*, depicted at the top of the linear array of the print head 112, are labeled. The ink nozzles 114*b*, 114*c*, 114*d*, and 114*e* are sequentially located between these labeled ink nozzles 114*a* and 114*f*.

When triggered to deposit ink for the second row (R2) by an ink fire impulse 144 received from the print head controller 140, the set of nozzle command signals 124*a* stored in memory of the print head 112 is executed. Here, a '1' is in the ink nozzle 114*a*, indicating that the ink nozzle 114*a* will deposit ink onto the substrate 111. The print command then continues to alternate, ending with a '0' for the ink nozzle 114*f*, indicating that the ink nozzle 114*f* will not deposit ink when triggered. The data row 158 is removed from the buffer memory 140*e*, and the print head 112 subsequently sends an encoder signal 162 to the print head controller 140, thereby triggering the start of a new print cycle.

Figure 6:
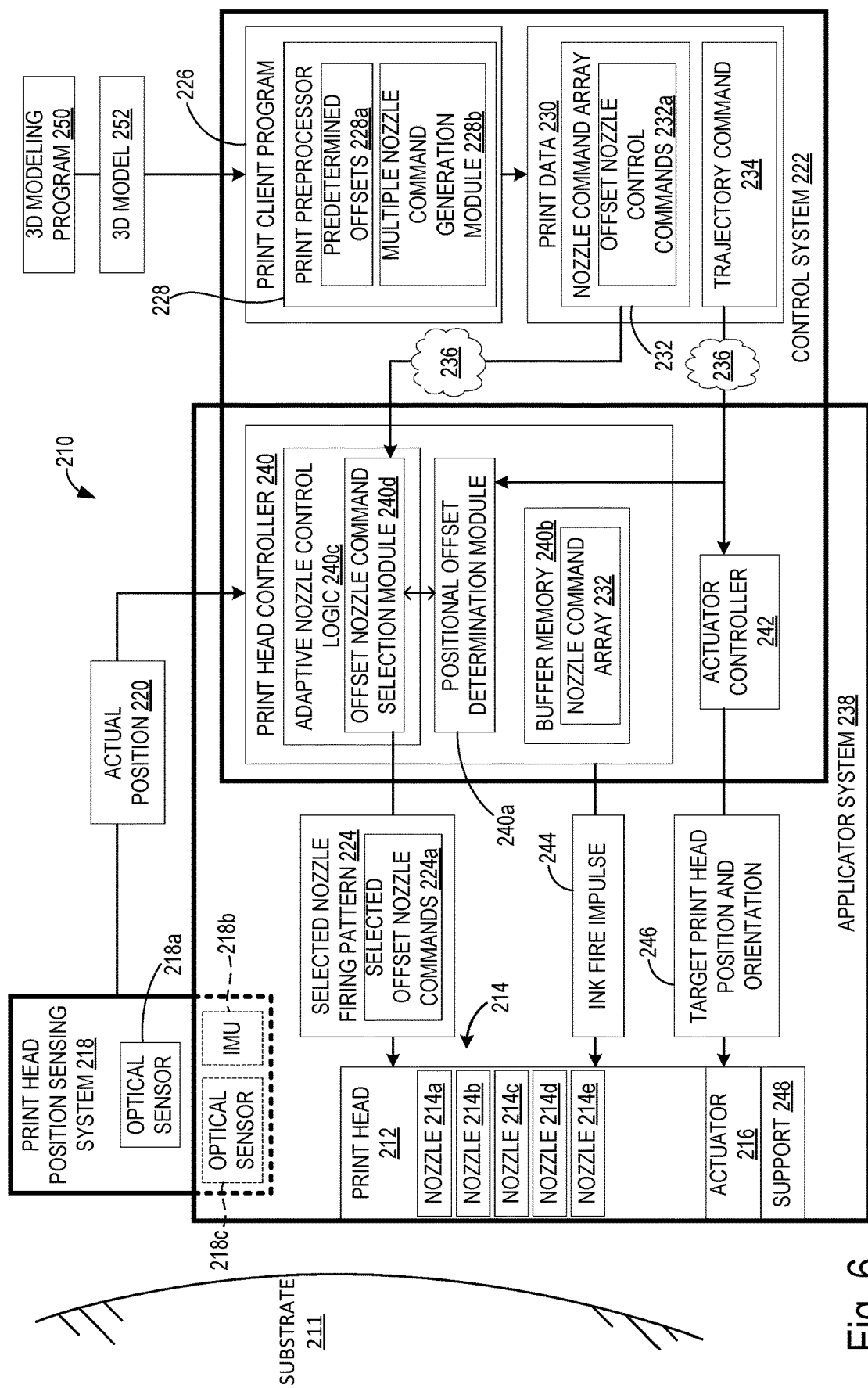
FIG. 6 is a general schematic diagram illustrating a printing system according to a third example embodiment of the subject disclosure.

Referring to FIG. 6, a printing system 210 is described in accordance with a third example embodiment of the present disclosure. The printing system 210 comprises a print head 212 including a plurality of ink nozzles 214; an actuator 216 configured to move the print head 212 relative to a substrate 211; a print head position sensing system 218 configured to detect an actual position 220 of the print head 212 relative to the substrate 211; and a controller 222 configured to: receive the actual position 220 of the print head 212 detected by the print head position sensing system 218 corresponding to a target print head position 246; determine a positional offset between the actual position 220 and the target print head position 246; and generate a nozzle firing pattern 224 based on the positional offset. The print head controller 240 is configured to send a nozzle command signal 224*a* to the print head 212 to trigger ink ejection of at least one of the plurality of ink nozzles 214 to control the print head 212 to print the selected nozzle firing pattern 224 at the target print head position 246 using the plurality of ink nozzles 214.

The print head position sensing system 218 can comprise an optical camera 218*a*. Additionally or alternatively, the print head position sensing system 218 can also include an optical camera 218*c* and an IMU 218*b* disposed on the print head 212. Although five ink nozzles 214*a-e* are depicted in FIG. 6, the number of ink nozzles in the print head 212 is not particularly limited.

The controller 222 includes a print head controller 240 and an actuator controller 242. The applicator system 238 includes the print head 212, print head controller 240, and the actuator controller 242. The print head 212 is mounted to an actuator 216. The print head 212 and the actuator 216 can be supported by a support 248. A 3D model 252 outputted by a 3D modeling program 250 is inputted into a print client program 226 executed by the controller 222. The print client program 226 can be executed on an offline control component that is connected to the controller 222 by a communications link. The print client program 226 includes a print client preprocessor 228 which processes the inputted 3D model 252, then generates and outputs print data 230 including a trajectory command signal 234 and a nozzle command array 232 comprising nozzle command signals 232*a*, including the nozzle firing pattern 224 which is selected by the print head controller 240. The print client preprocessor 228 sends the trajectory command signal 234 to the actuator controller 242 via a communications link 236. In response, the actuator controller 242 controls the actuator 216 to move the print head 212 to print the selected nozzle firing pattern 224 at the target print head position 246 using the plurality of ink nozzles 214.

The print client preprocessor 228 is further configured to generate the nozzle firing pattern 224, at least by identifying a plurality of predetermined candidate positional offsets 228*a*; executing a multiple nozzle command generation module 228*b* to generate a respective offset nozzle command signal 232*a* for each of the plurality of predetermined candidate positional offsets; and sending each of the respective offset nozzle command signals 232*a* to the print head controller 240 as a nozzle command array 232.

The nozzle command array 232 is stored in the buffer memory 240*b* of the print head controller 240. The print head controller 240 is configured to receive the nozzle command array (nozzle firing patterns) 232*a* sent by the print client preprocessor 228 to the print head controller 240 via the communications link 236. The print head controller 240 then controls the print head 212 to print the nozzle firing pattern 224 at least by selecting an offset nozzle command signal 224*a* from the nozzle command array 232 based at least on the nozzle command signal 232*a* and the determined positional offset; and sending the selected offset nozzle command signal 224*a* to the print head 212 to control the print head 212 to print the nozzle firing pattern 224 at the target print head position 246 using at least one of the plurality of ink nozzles 214. The print head controller 240 sends an ink fire impulse 244 to the ink nozzles 214 in control cycles, and sends the nozzle firing pattern 224 to the ink nozzles 214 synchronized with the control cycles at which the ink fire impulse 244 is sent. Like the second example embodiment, the plurality of predetermined candidate positional offsets of the third example embodiment can include a left shift offset, zero offset, and a right shift offset; and the nozzle command array 232 is stored in a buffer memory 240*b* of the print head controller 240.

The print head controller 240 can be configured with an adaptive nozzle control logic 240*c* executing an offset nozzle command selection module 240*d* which receives the nozzle command array 232. A positional offset determination module 240*a* of the adaptive nozzle control logic 240*c* receives the trajectory command signal 234 and the actual position 220 of the print head 212, and subsequently determines the positional offset between the actual position 220 and the target print head position 246. The positional offset determination module 240*a* outputs the positional offset to the offset nozzle command selection module 240*d*, which selecting an offset nozzle command signal 224*a* from the nozzle command array 232 based at least on the nozzle command signal 232*a* and the determined positional offset.

Figure 7:
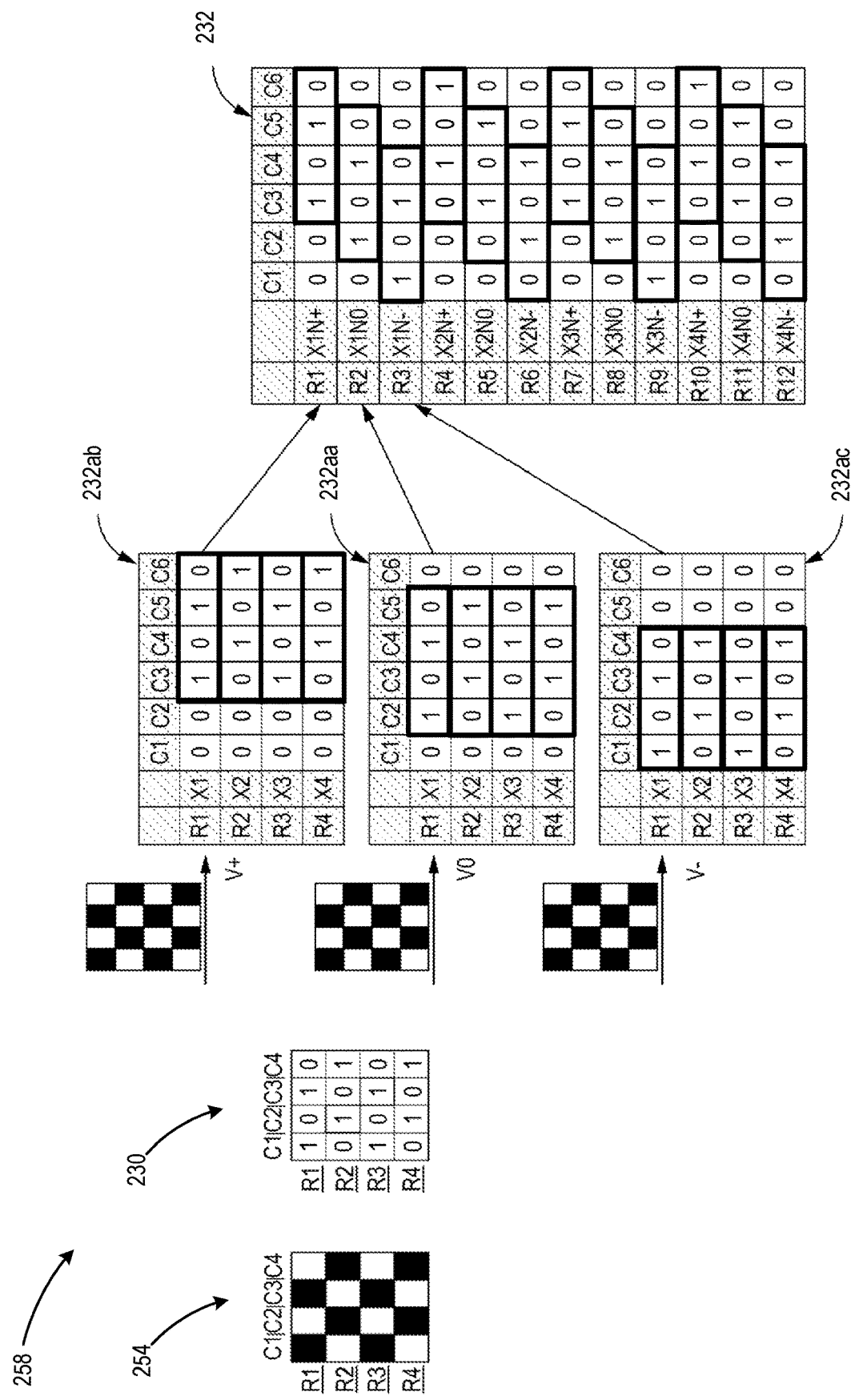
FIG. 7 is an illustration of a series of processes in printing according to the third example embodiment of FIG. 6.

FIG. 7 illustrates a series of processes 258 in printing, in accordance with an embodiment of the present disclosure, which include processing of an image data 254 to print via a multiplex approach.

Here, the initial image data 254 included in the 3D model 252 is similar to initial image data 156 of FIG. 4, but for clarity, only includes the columns C1-C4 and the rows R1-R4. The initial image data 254 can be processed and rasterized by the print client preprocessor 228 into print data 230, which can be a bitmap with a '1' indicating ink is to be deposited and a '0' indicating no ink is to be deposited.

Next, the print client preprocessor 228 generates a plurality of different nozzle command signals 232*aa*, 232*ab*, 232*ac* for control of the ink nozzles 214. Here, the nozzle command signals 232*aa*, 232*ab*, 232*ac* include six columns, whereas the initial image data 254 only includes four columns. The additional two columns in the nozzle command signals 232*aa*, 232*ab*, 232*ac* provide for shifting the activation instructions for the ink nozzles 114 rightward or leftward relative to the print head 212. A nozzle command signal 232*aa* is generated, for example, by the print client preprocessor 228 that generates activation instructions for the ink nozzles 214. Here, the ink nozzles 214 include those ink nozzles 214*b-e* that map to the columns 2-5. Ink nozzles 214 mapping to columns 1 and 6 are vacant and are filled with non-activation instructions, or a '0'.

For each row in the print data 230, the print client preprocessor 228 generates zero offset nozzle command signals 232*aa*, right shift offset nozzle command signals 232*ab*, and left shift offset nozzle command signals 232*ac*. In the zero offset nozzle command signals 232*aa*, no shifts are applied. In the right shift offset nozzle command signals 232*ab*, the bit pattern in the set of nozzle command signals 232*aa* is shifted rightward relative to the print head 212.

The print client preprocessor 228 then combines the nozzle command signals 232*aa*, 232*ab*, and 232*ac* into a nozzle command array 232. In a first row (R1) of the nozzle command array 232 are the activation instructions from the first row (R1) from the right shift offset nozzle command signal 232*ab*. In the second row (R2) of the nozzle command array 232 are the activation instructions from the first row (R1) from the zero offset nozzle command signal 232*aa*. In the third row (R3) of the nozzle command array 232 are the activation instructions from the first row (R1) of the left shift offset nozzle command signal 232*ac*. Thus, each of these first three rows R1-R3 in the nozzle command array 232 all are activation instructions for printing the first row (R1) of the image data 254.

The nozzle command array 232 is sent by the print client preprocessor 228 to the print head controller 240, which stores the nozzle command array 232 in buffer memory 240*b*. Responsive to determining no positional offset between the actual position 220 of the print head 212 and the target print head position 246, the print head controller 240 selects the zero offset nozzle command signals 232*aa* to send to the print head 212 to trigger ink ejection of at least one of the plurality of ink nozzles 214 to print the first row (R1) of the initial image data 254. Responsive to determining a right shift positional offset, the print head controller 240 selects the right shift offset nozzle command signals 232*ab* to send to the print head 212 to trigger ink ejection of at least one of the plurality of ink nozzles 214 to print the first row (R1) of the initial image data 254. Responsive to determining a left shift positional offset, the print head controller 240 selects the left shift offset nozzle command signals 232*ac* to send to the print head 212 to trigger ink ejection of at least one of the plurality of ink nozzles 214 to print the first row (R1) of the initial image data 254. The non-selected nozzle command signals 232*aa*, 232*ab*, 232*ac* for that row of the image data 254 can be discarded from the buffer memory 240*b*.

In some embodiments, the image data 254 includes multiple rows R1-R4. As discussed above, the first row of the image data 254 can be processed and placed into the buffer memory 240*b*. Here, with right-offset nozzle command signal 232*ab*, a left-offset nozzle command signal 232*ac*, and a nozzle command signal 232*aa*, the first three rows (R1-R3) of the buffer memory 240*b* are each associated with the first row (R1) of the image. For a second row of the image (R2), this additional row can also be processed and generate the zero offset nozzle command signals 232*aa* and the offset nozzle command signals 232*ab*, 232*ac*. Likewise, the next three rows (R4-R6) of the buffer memory 240*b* include activation instructions for printing the second row (R2) of the image data 254.

As shown in FIG. 7, the generation of the zero offset nozzle command signals 232*aa*, the right shift offset nozzle command signals 232*ab*, and the left shift offset nozzle command signals 232*ac* for each of the four rows (R1-R4) of the image data 254 results in a nozzle command array 232 that includes twelve total rows (R1-R12). Only one third of the activation instructions in the nozzle command array 232 are utilized, with the remaining two thirds of the activation instructions being discard because only one of the three sets of offset nozzle command signals 232*aa*, 232*ab*, 232*ac* can be selected for each row of the image data 254. After selecting one of the three sets of offset nozzle command signals 232*aa*, 232*ab*, 232*ac* for the first row of image data based on the determined positional offset of the print head 212, the non-selected nozzle commands are discarded, and the print head controller 240 then selects one of the next nozzle commands to activate for the subsequent row of image data 254.

In some embodiments, the print head controller 240 can be configured to operate a print head 212 that includes a plurality of different colors. Each color can have its own ink nozzles 214 arranged in a separate linear array. A separate set of nozzle command signals 232*aa* and offset nozzle command signals 232*ab*, 232*ac* can be generated for each color, and activation instructions from the nozzle command can be placed in separate buffers different from the buffer memory 240*b* for each of the different colors. The print head controller 240 can be configured to activate the ink nozzles 214 for the different colors independently.

Figure 8:
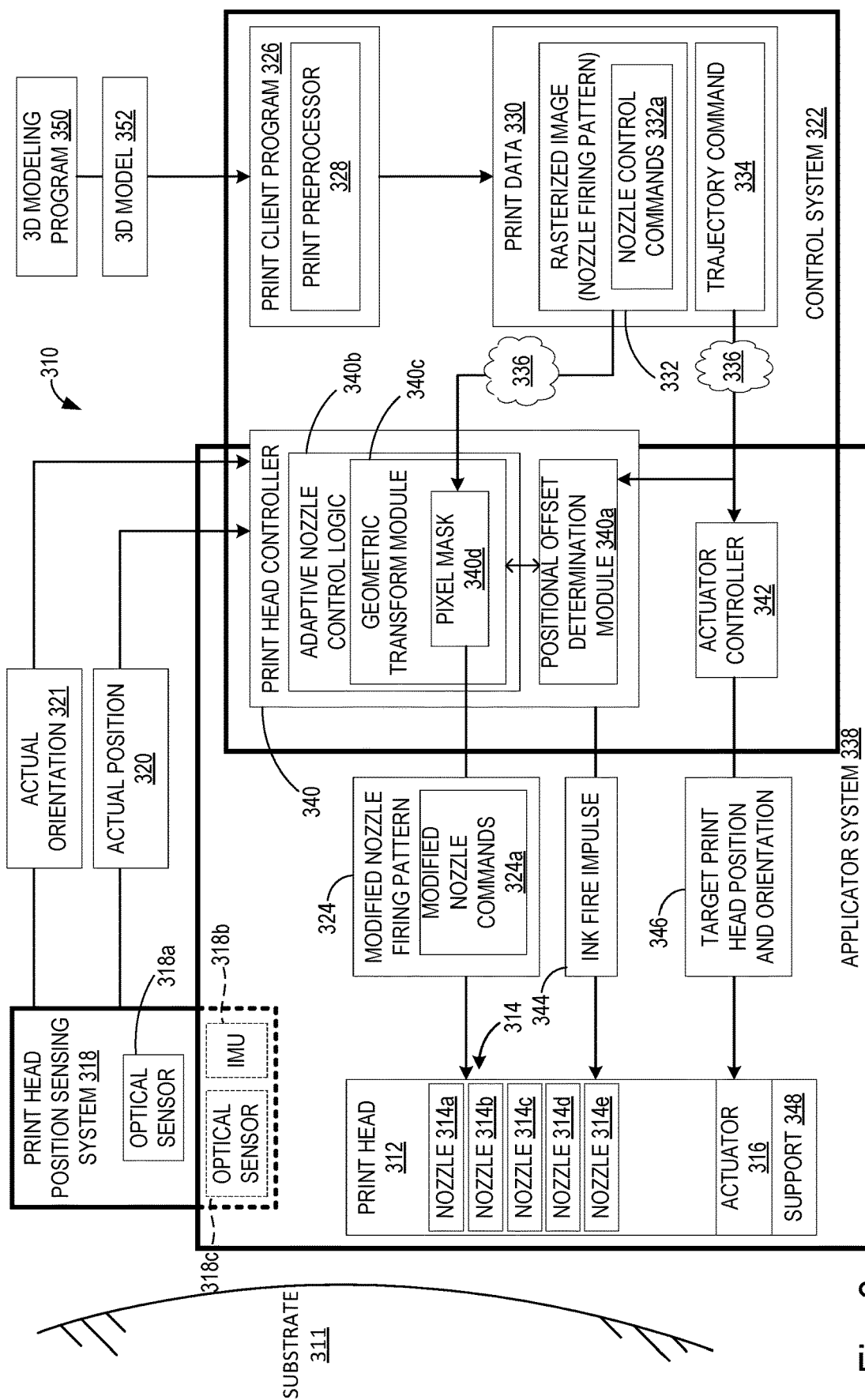
FIG. 8 is a general schematic diagram illustrating a printing system according to a fourth example embodiment of the subject disclosure.

Referring to FIG. 8, a printing system 310 is described in accordance with a fourth example embodiment of the present disclosure. The printing system 310 comprises a print head 312 including a plurality of ink nozzles 314; an actuator 316 configured to move the print head 312 relative to a substrate 311; a print head position sensing system 318 configured to detect an actual position 320 and an actual orientation 321 of the print head 312 relative to the substrate 311; and a controller 322 configured to: receive the actual position 320 and the actual orientation 321 of the print head 312 detected by the print head position sensing system 318 corresponding to a target print head position and orientation 346; determine a positional offset between the actual position 320 and the target print head position and orientation 346; and generate a nozzle firing pattern 324 based on the positional offset. The print head controller 340 is configured to send a nozzle command signal 324a to the print head 312 to trigger ink ejection of at least one of the plurality of ink nozzles 314 to control the print head 312 to print the nozzle firing pattern 324 at the target print head position and orientation 346 using the plurality of ink nozzles 314.

The print head position sensing system 318 can comprise an optical camera 318a. Additionally or alternatively, the print head position sensing system 318 can also include an optical camera 318c and an IMU 318b disposed on the print head 312. Although five ink nozzles 314a-e are depicted in FIG. 8, the number of ink nozzles in the print head 312 is not particularly limited.

The controller 322 includes a print head controller 340 and an actuator controller 342. The applicator system 338 includes the print head 312, print head controller 340, and the actuator controller 342. The print head 312 is mounted to an actuator 316. The print head 312 and the actuator 316 can be supported by a support 348. A 3D model 352 outputted by a 3D modeling program 350 is inputted into a print client program 326 executed by the controller 322. The print client program 326 can be executed on an offline control component that is connected to the controller 322 by a communications link. The print client program 326 includes a print client preprocessor 328 which processes the inputted 3D model 352, then generates and outputs print data 330 including a trajectory command signal 334 and a rasterized image 332 which is a nozzle firing pattern including nozzle command signals 332a. The print client preprocessor 328 sends the trajectory command signal 334 to the actuator controller 342 via a communications link 336. In response, the actuator controller 342 controls the actuator 316 to move the print head 312 to print the nozzle firing pattern 324 at the target print head position and orientation 346 using the plurality of ink nozzles 314.

The print head position sensing system 318 is further configured to detect an actual orientation 321 of the print head 312 relative to the substrate 311; and the print head controller 340 is further configured to: generate the nozzle firing pattern 324 by, at least: receiving a rasterized image 332; generating a pixel mask 340d based on the actual position 320, actual orientation 321, and a determined positional offset; and geometrically transforming the rasterized image 332 into the pixel mask 340d, each pixel in the pixel mask 340d corresponding to a nozzle of the plurality of ink nozzles 314. The print head controller 340 controls the print head 312 to print the nozzle firing pattern 324 by, at least: selecting an offset nozzle command signal 324a corresponding to the pixel mask 340d; and sending the selected offset nozzle command signal 324a to the print head 312 to control the print head 312 to print the nozzle firing pattern 324 at the target print head position and orientation 346 using the plurality of ink nozzles 314. The print head controller 340 sends an ink fire impulse 344 to the ink nozzles 314 in control cycles, and sends the nozzle firing pattern 324 to the ink nozzles 314 synchronized with the control cycles at which the ink fire impulse 344 is sent.

The print head controller 340 can be configured with an adaptive nozzle control logic 340b executing a geometric transformation module 340c which uses the pixel mask 340d to geometrically transform the received rasterized image 332. A positional offset determination module 340a of the adaptive nozzle control logic 340b receives the trajectory command signal 334, the actual orientation 321, and the actual position 320 of the print head 312, and subsequently determines the positional offset between the actual position 320 and the actual orientation 321 and the target print head position and orientation 346. The positional offset determination module 240a outputs the positional offset to the geometric transformation module 340c, which generates the pixel mask 340d based on the determined positional offset.

Figure 9:
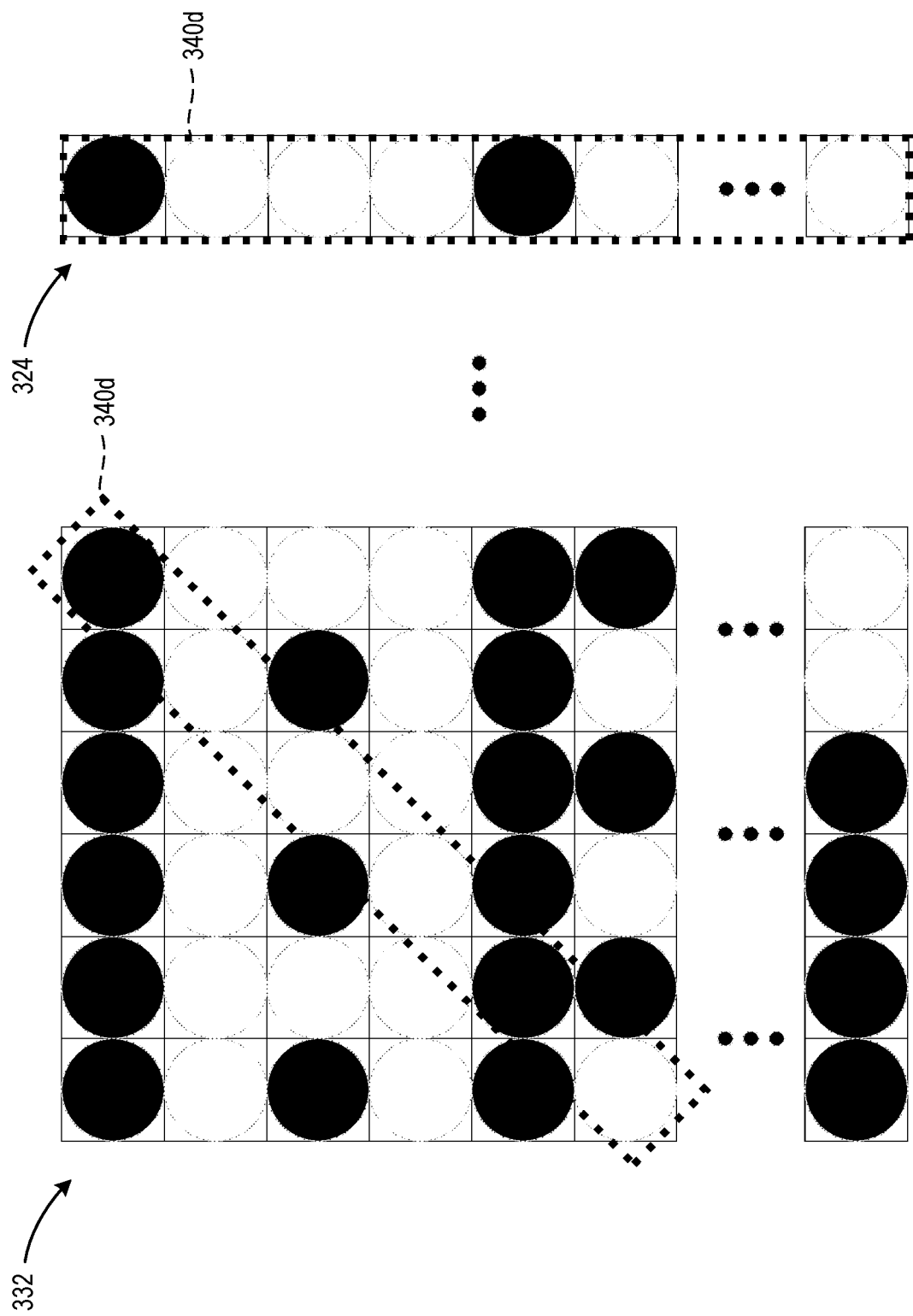
FIG. 9 is an illustration of a pixel mask generated by the print head controller of the print system according to the fourth example embodiment of FIG. 8.

Referring to FIG. 9, the pixel mask 340d, comprising a grid 368 of pixel locations, is generated having a tilt and a position corresponding to the actual position 320 and actual orientation 321; and the rasterized image 332 is geometrically transformed into the pixel mask 340d by superimposing the pixel mask 340d onto the rasterized image 332, and filling a pixel location of the grid 368 when the pixel location overlaps a filled pixel of the rasterized image 332. The filled pixel mask 340d is then used as the nozzle firing pattern 324 which is sent to the print head 312 to be printed on the substrate 311.

Figure 10:
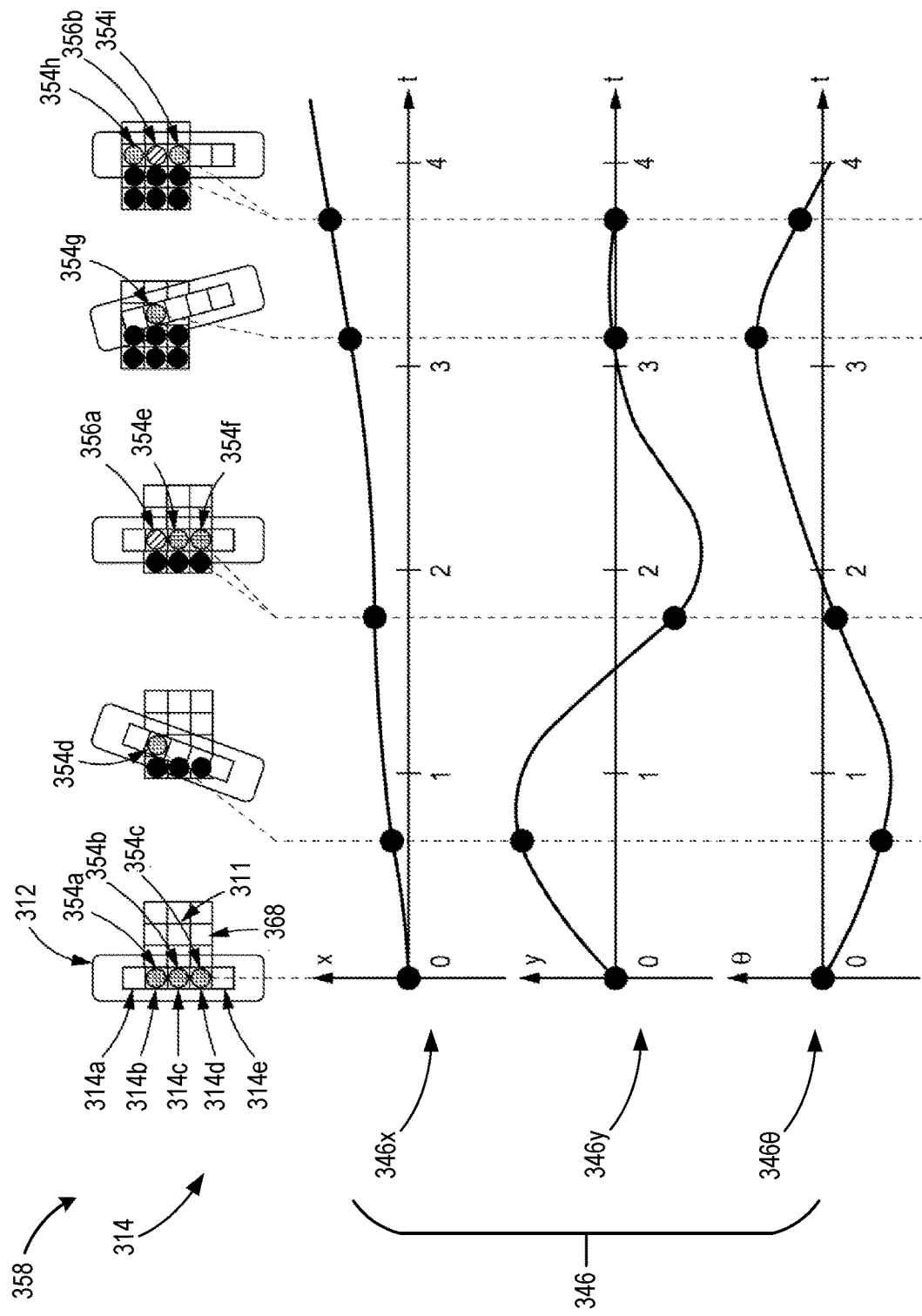
FIG. 10 is an illustration of a series of processes in printing according to the fourth example embodiment of FIG. 8.

FIG. 10 illustrates a print head 312 printing on a substrate at various positions and times, in accordance with the fourth example embodiment of the present disclosure. In particular, FIG. 10 depicts the view 358 having a print head 312 printing on the substrate 311 at various times, each time having a different advance, transfer, and tilt position of the print head 312. Such aspects can be used to print via a geometrical-transformation approach. The print head position sensing system 318 can be configured to determine an advance 346x, a transfer 346y, and a tilt 346θ as part of determining the actual position 320 and actual orientation 321 of the print head 312.

In the view 358, a grid 368 is overlaid on the substrate 311 to depict locations on the substrate 311 for purposes of clarity. In actuality, a grid 368 need not be overlaid onto the actual substrate 311, as it is simply depicted in the view 358 for purposes of explanation.

The various timelines graph the advance, transfer, and tilt at times 0, 1, 2, 3, and 4. At the time 0, the print head 12 includes no advance, transfer, or tilt, with each value being graphed at 0. For purposes of convention, the x-direction extends from left to right along the grid 368, the y-direction extends up and down along the grid 368, and the tilt is a measure of angle of the print head 312.

As before, the print head 312 includes a plurality of ink nozzles 314 in a linear array. Here, the first ink nozzle 314a is depicted at the top, with each subsequent ink nozzle 314 in the linear array following, with the final ink nozzle 314e at the bottom. Because each ink nozzle 314 is fixed within the print head, individual locations of the ink nozzles in the plurality of ink nozzles 314 can be determined based on the position and orientation 346 of the print head 312.

At time 0, the print head 312 deposits ink droplets on each of the first three locations in the grid 368: the top, center, and bottom positions of the first up-down column of the grid 368. Because there is no advance, transfer, or tilt error, the print head controller 340 is able to map each of the activation instructions to the ink nozzles 14b, 14c, and 14d to deposit ink onto the substrate 311, as indicated by the circles filled with ink droplets 354a, 354b, and 354c.

Near time '1', the print head controller 340 is triggered to deposit ink onto the substrate 311. At this moment, the print head 312 has advanced in the x-direction and transferred in the y-direction, as indicated by the positive values graphed just before the time '1'. However, the print head 312 also has tilted as indicated by the negative measurement of the tilt 346e. As seen in the depiction of the print head 312, only the ink nozzle 314b correlates to the topmost location of the second up-down column of the grid 368. As such, the mapped nozzle command only includes an activation instruction for the ink nozzle 314b to deposit ink. Also shown near time '1' are the ink droplets 354a, 354b, and 354c (not labeled for clarity) that were deposited at time '0' and now appear as black circles.

Near time '2', the print head controller 340 is configured to deposit the ink droplets 354e and 354f via the ink nozzles 314c and 314d, respectively. The ink droplet 354e is located in the middle of the second column of the grid 368 and the ink droplet 354f is located in the bottom of the second column of the grid 368. Because the top of the second column already received the ink droplet 354d near time '1', the ink nozzle 314b receives a non-activation command signal 356a, indicated by a circle filled with a cross hatch.

Near time '3', the print head 312 continues to advance, and has a 0 transfer 346y. However, the print head 312 now has an opposite tilt as that depicted near time '1'. As such, only the ink nozzle 314b is aligned with the center position of the third column of the grid 368. As such, the print head controller 340 maps the nozzle command from the buffer memory to an activation instruction associated with the ink nozzle 314b to deposit the ink droplet 354g. Also shown in the view of the print head 312 near time '3' is the ink droplet 354d deposited near time '1' and the ink droplets 354e and 354f deposited near time '2'. Each of these ink droplets are now depicted as black circles.

Near time '4', the process repeats to deposit ink into the third column of the grid 368. Here, the middle column has already received the ink droplet 354g near time '3' and thus receives the non-activation command signal 356b for the ink nozzle 314b, whereas the ink nozzles 314a and 314c each receive activation instructions to deposit ink droplets 354h and 354i, respectively, into the top and bottom positions of the third column of the grid 368.

Figure 11:
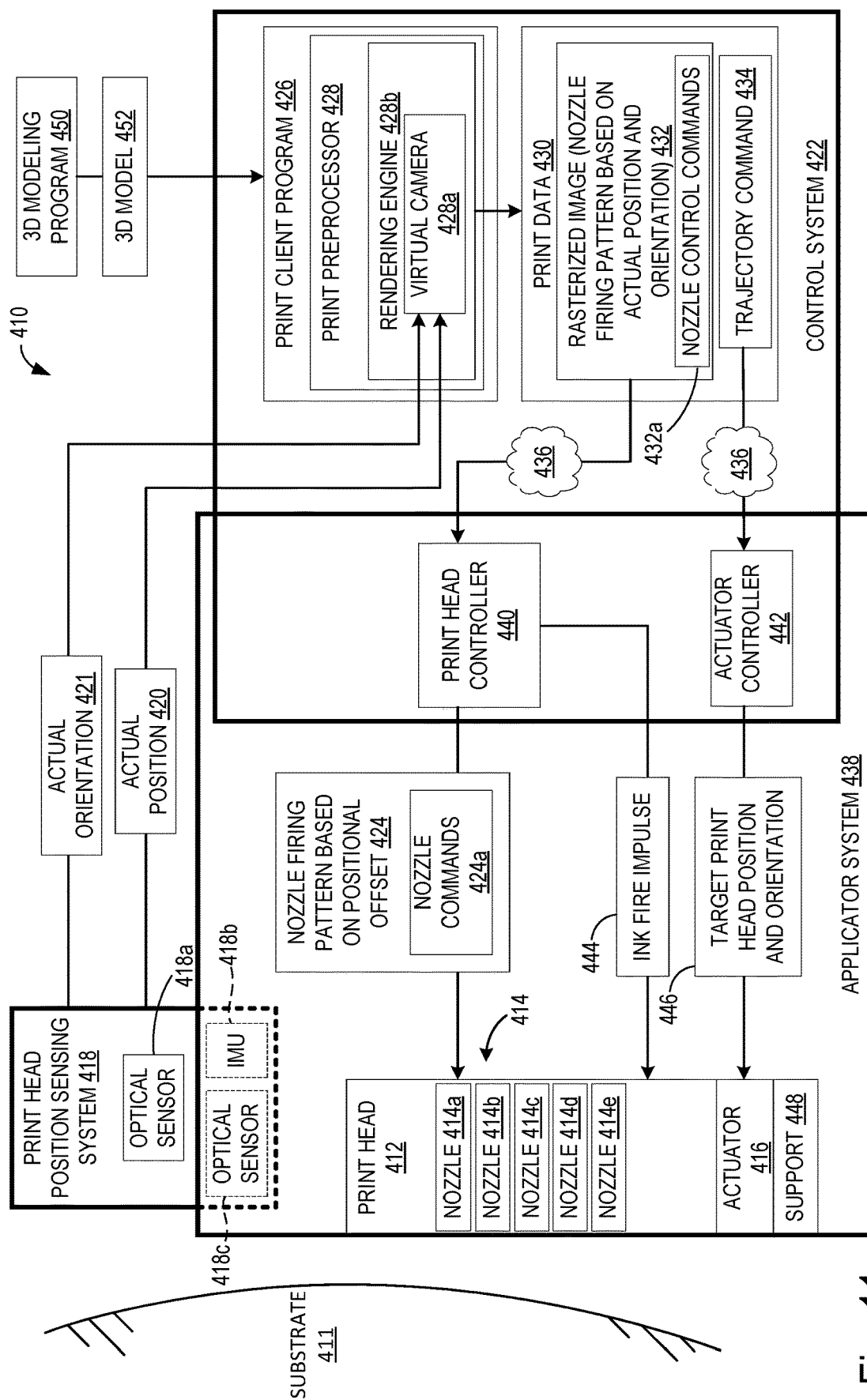
FIG. 11 is a general schematic diagram illustrating a printing system according to a fifth example embodiment of the subject disclosure.

Referring to FIG. 11, a printing system 410 is described in accordance with a fifth example embodiment of the present disclosure. The printing system 410 comprises a print head 412 including a plurality of ink nozzles 414; an actuator 416 configured to move the print head 412 relative to a substrate 411; a print head position sensing system 418 configured to detect an actual position 420 and an actual orientation 421 of the print head 412 relative to the substrate 411; and a controller 422 configured to: receive the actual position 420 and the actual orientation 421 of the print head 412 detected by the print head position sensing system 418 corresponding to a target print head position and orientation 446; determine a positional offset between the actual position 420 and the actual orientation 421 and the target print head position and orientation 446; generate a nozzle firing pattern 424 based on the positional offset; and control the print head 412 to print the nozzle firing pattern 424 at the target print head position and orientation 446 using the plurality of ink nozzles 414. In this embodiment, it will be appreciated that the positional offset between the actual position 420 and the actual orientation 421 and the target print head position and orientation 446 is determined by rendering a virtual camera 428a at a virtual position and a virtual orientation corresponding to the actual position 420 and the actual orientation 421, respectively. Further, the nozzle firing pattern 424 based on the positional offset is generated based on a perspective of the virtual camera and the actual position 420 and the actual orientation 421. The print head position sensing system 418 can comprise an optical camera 418c and an IMU 418b disposed on the print head 412. The print head position sensing system 418 can also include an optical camera 418a provided outside of the applicator system 438.

The print head position sensing system 418 can comprise an optical camera 418a. Additionally or alternatively, the print head position sensing system 418 can also include an optical camera 418c and an IMU 418b disposed on the print head 412. Although five ink nozzles 414a-e are depicted in FIG. 11, the number of ink nozzles in the print head 412 is not particularly limited.

The controller 422 includes a print head controller 440 and an actuator controller 442. The applicator system 438 includes the print head 412, print head controller 440, and the actuator controller 442. The print head 412 is mounted to an actuator 416. The print head 412 and the actuator 416 can be supported by a support 448. A 3D model 452 outputted by a 3D modeling program 450 is inputted into a print client program 426 executed by the controller 422. The print client program 426 can be executed on a real-time control component of the controller 422. The print client program 426 includes a print client preprocessor 428 which processes the inputted 3D model 452, then generates and outputs print data 430 including a trajectory command signal 434 and a rasterized image 432 which is a nozzle firing pattern including nozzle command signals 432a. The print client preprocessor 428 sends the trajectory command signal 434 to the actuator controller 442 via a communications link 436. In response, the actuator controller 442 controls the actuator 416 to move the print head 412 to print the nozzle firing pattern 424 at the target print head position and orientation 446 using the plurality of ink nozzles 414.

The printing system 410 further comprises a print client preprocessor 428 configured to generate the nozzle firing pattern 432. The controller 422 includes a print head controller 440 configured to send a nozzle command signal 424a to the print head 412 to trigger ink ejection of at least one of the plurality of ink nozzles 414. The print head position sensing system 418 is further configured to detect an actual orientation 421 of the print head 412 relative to the substrate 411.

The print client preprocessor 428 is configured to receive the actual position 420 and actual orientation 421 of the print head 412 detected by the print head position sensing system 418, and generate the nozzle firing pattern 432. The print client preprocessor 428 is configured to generate the nozzle firing pattern 432 at least by: executing a rendering engine 428b to render the substrate 411 as a virtual substrate in a virtual scene; rendering a virtual camera 428a in the virtual scene at a virtual position and a virtual orientation relative to the virtual substrate corresponding to the actual position 420 and the actual orientation 421, respectively; and generating the nozzle firing pattern 432 as a rasterized image based on a perspective of the virtual camera 428a and the actual position 420 and actual orientation 421, such that the nozzle firing pattern 424 accounts for the actual position 420 and actual orientation 421. The print head controller 440 is further configured to control the print head 412 to print the nozzle firing pattern 424. The print head controller 440 sends an ink fire impulse 444 to the ink nozzles 414 in control cycles, and sends the nozzle firing pattern 424 to the ink nozzles 414 synchronized with the control cycles at which the ink fire impulse 444 is sent.

Figure 12:
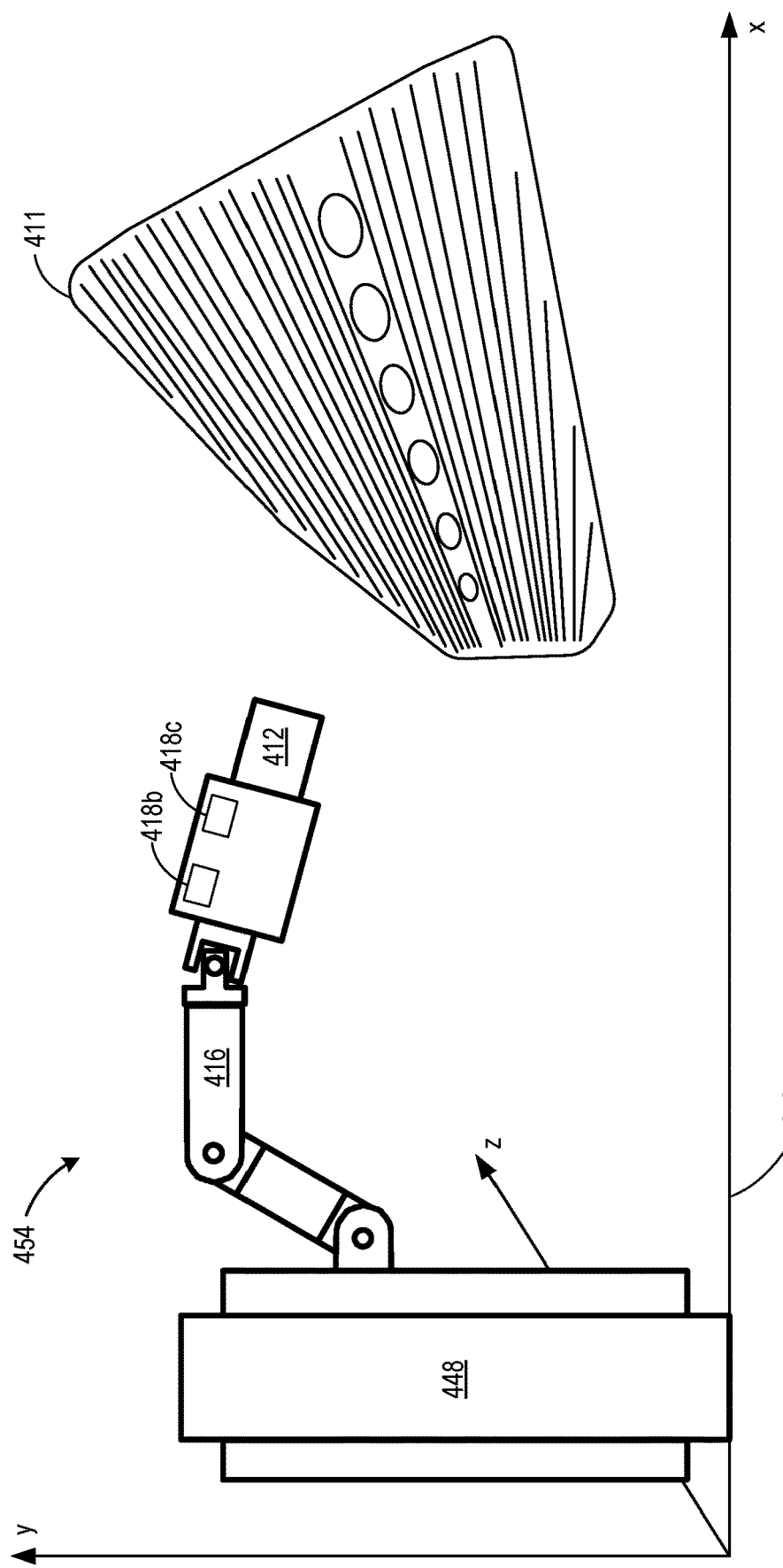
FIG. 12 is an illustration of a real scene in a real three-dimensional coordinate space of the printing system according to the fifth example embodiment of FIG. 11.

Referring to FIG. 12, the printing system 410 is depicted in a real scene 454 in a real three-dimensional coordinate space 456 of a real world three-dimensional environment in accordance with an example of the fourth example embodiment of the present disclosure. In this real scene 454, the optical camera 418c and the IMU 418b are disposed on the print head 412, which is mounted to the actuator 416 supported by the support 448. In this example, the actuator 416 is configured as a robotic manipulator. The print head 412 is positioned to print the nozzle firing pattern 424 on the substrate 411.

Figure 13:
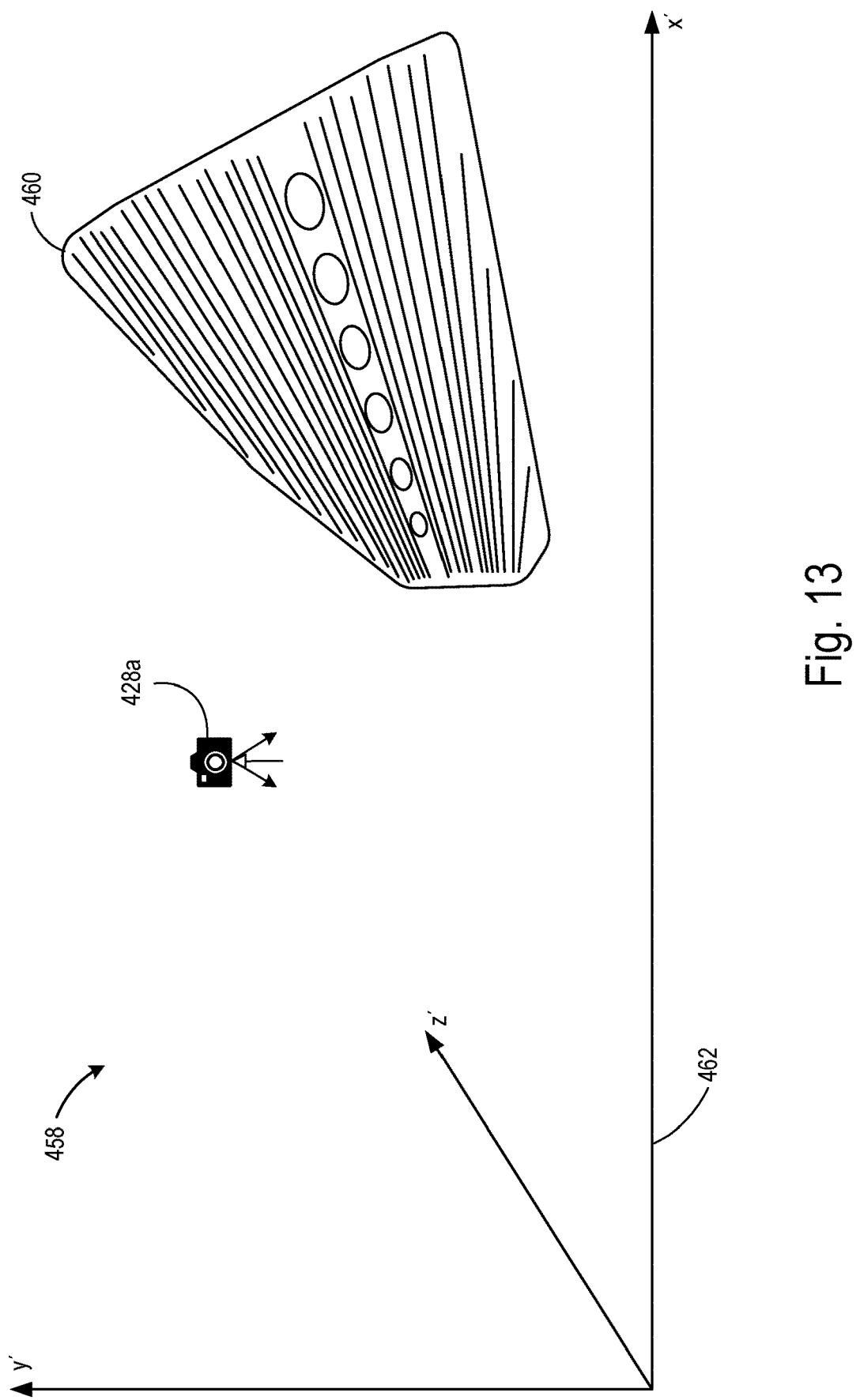
FIG. 13 is an illustration of a virtual scene in a virtual three-dimensional coordinate space of the printing system according to the fifth example embodiment of FIG. 11.

Referring to FIG. 13, the rendering engine 428b, which can be executed by a hardware artificial intelligence accelerator of the print client preprocessor 428, renders the virtual scene 458 corresponding to the real scene 454, including the virtual substrate 460 corresponding to the real substrate 411, and the virtual camera 428a corresponding to the optical camera 418c in a virtual three-dimensional coordinate space 462 overlaid upon the real three-dimensional coordinate space 456 of the real world three-dimensional environment. One example of a hardware artificial intelligence accelerator is a graphics processing unit (GPU). Thus, the virtual camera 428a is rendered at the virtual position and the virtual orientation relative to the virtual substrate 460 corresponding to the actual position 420 and the actual orientation 421.

Figure 14:
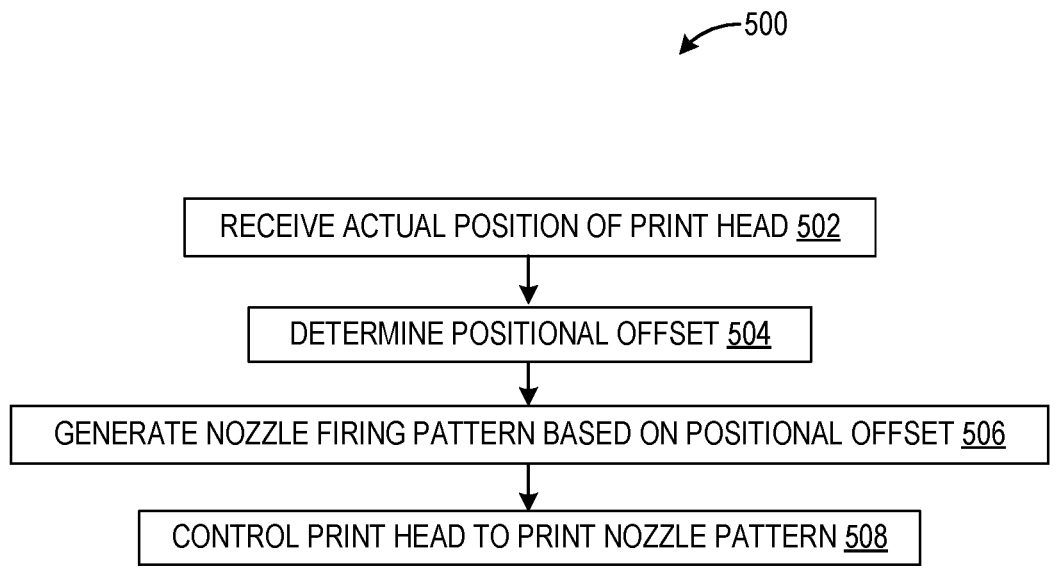
FIG. 14 is a flowchart of a printing method for the printing system according to the first example embodiment of the subject disclosure.

In FIG. 14, a method 500 is illustrated for controlling a print head to print a nozzle pattern, according to one example implementation. The following description of method 500 is provided with reference to the software and hardware components described above and shown in FIGS. 1 through 13. It will be appreciated that method 500 also can be performed in other contexts using other suitable hardware and software components. At step 502, the actual position of the print head detected by the print head position sensing system corresponding to a target print head position is received. At step 504, a positional offset between the actual position and the target print head position is determined. At step 506, a nozzle firing pattern is generated based on the positional offset. At step 508, the print head is controlled to print the nozzle firing pattern at the target print head position using the plurality of ink nozzles.

Figure 15:
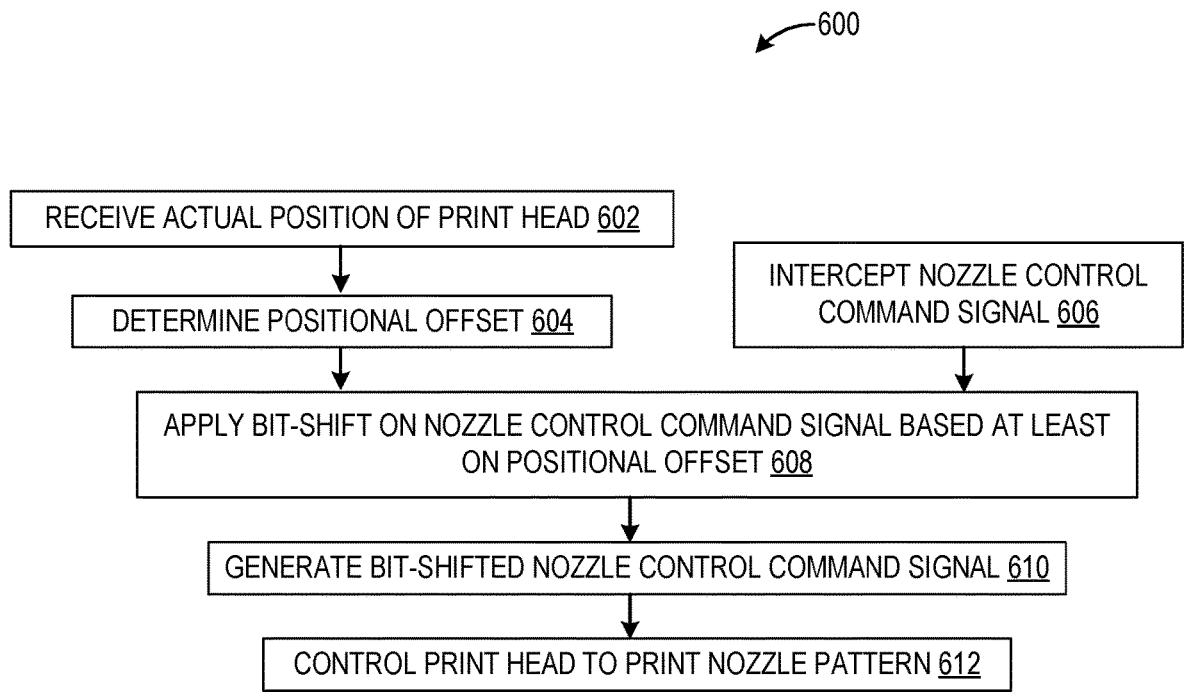
FIG. 15 is a flowchart of a printing method for the printing system according to the second example embodiment of the subject disclosure.

In FIG. 15, a method 600 is illustrated for controlling a print head to print a nozzle pattern, according to one example implementation. The following description of method 600 is provided with reference to the software and hardware components described above and shown in FIGS. 1 and 3-5. It will be appreciated that method 600 also can be performed in other contexts using other suitable hardware and software components. At step 602, the actual position of the print head detected by the print head position sensing system corresponding to a target print head position is received. At step 604, a positional offset between the actual position and the target print head position is determined. At step 606, the nozzle command signal is intercepted. At step 608, a bit-shift is applied on the nozzle command signal based at least on the determined positional offset. At step 610, a bit-shifted nozzle command signal is generated. At step 610, the print head is controlled to print the nozzle firing pattern by, at least: sending the bit-shifted nozzle command signal to the print head to control the print head to print the nozzle firing pattern at the target print head position using the plurality of ink nozzles.

Figure 16:
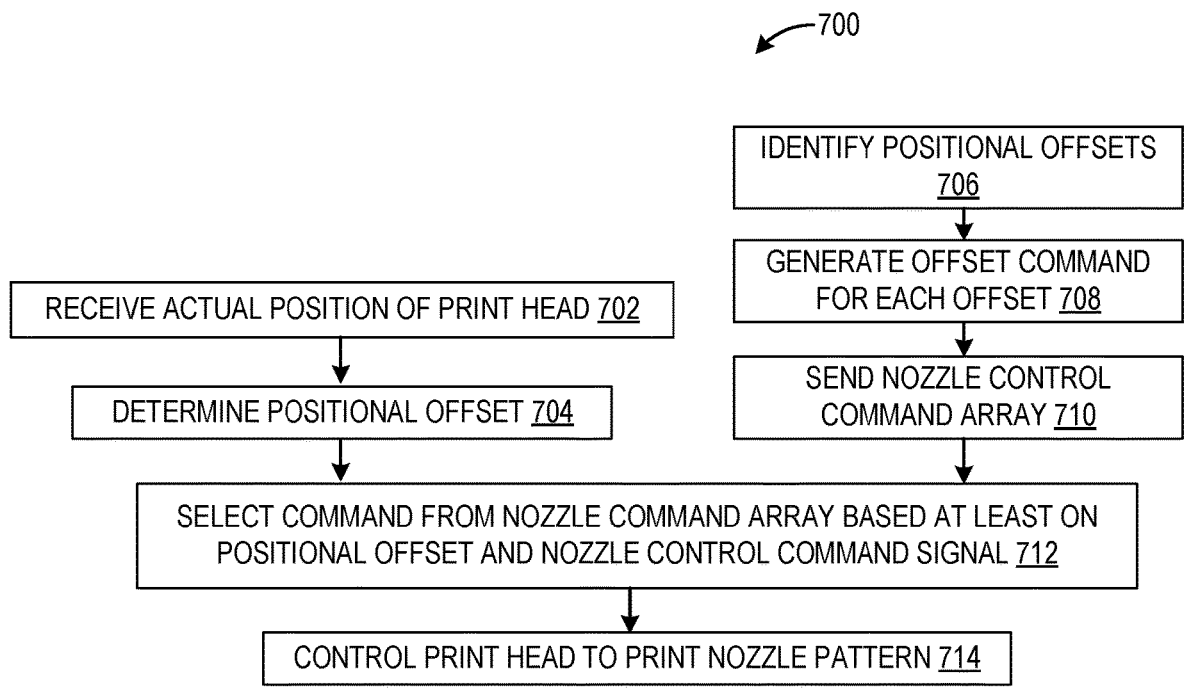
FIG. 16 is a flowchart of a printing method for the printing system according to the third example embodiment of the subject disclosure.

In FIG. 16, a method 700 is illustrated for controlling a print head to print a nozzle pattern, according to one example implementation. The following description of method 700 is provided with reference to the software and hardware components described above and shown in FIGS. 1, 6, and 7. It will be appreciated that method 700 also can be performed in other contexts using other suitable hardware and software components. At step 702, the actual position of the print head detected by the print head position sensing system corresponding to a target print head position is received. At step 704, a positional offset between the actual position and the target print head position is determined.

At step 706, a plurality of predetermined candidate positional offsets are identified. At step 708, a respective offset nozzle command is generated for each of the plurality of predetermined candidate positional offsets. At step 710, each of the respective offset nozzle commands is sent in a nozzle command array.

At step 712, an offset nozzle command is selected from the nozzle command array based at least on the nozzle command signal and the determined positional offset. At step 714, the selected offset nozzle command signal is sent to the print head to control the print head to print the nozzle firing pattern at the target print head position using the plurality of ink nozzles.

Figure 17:
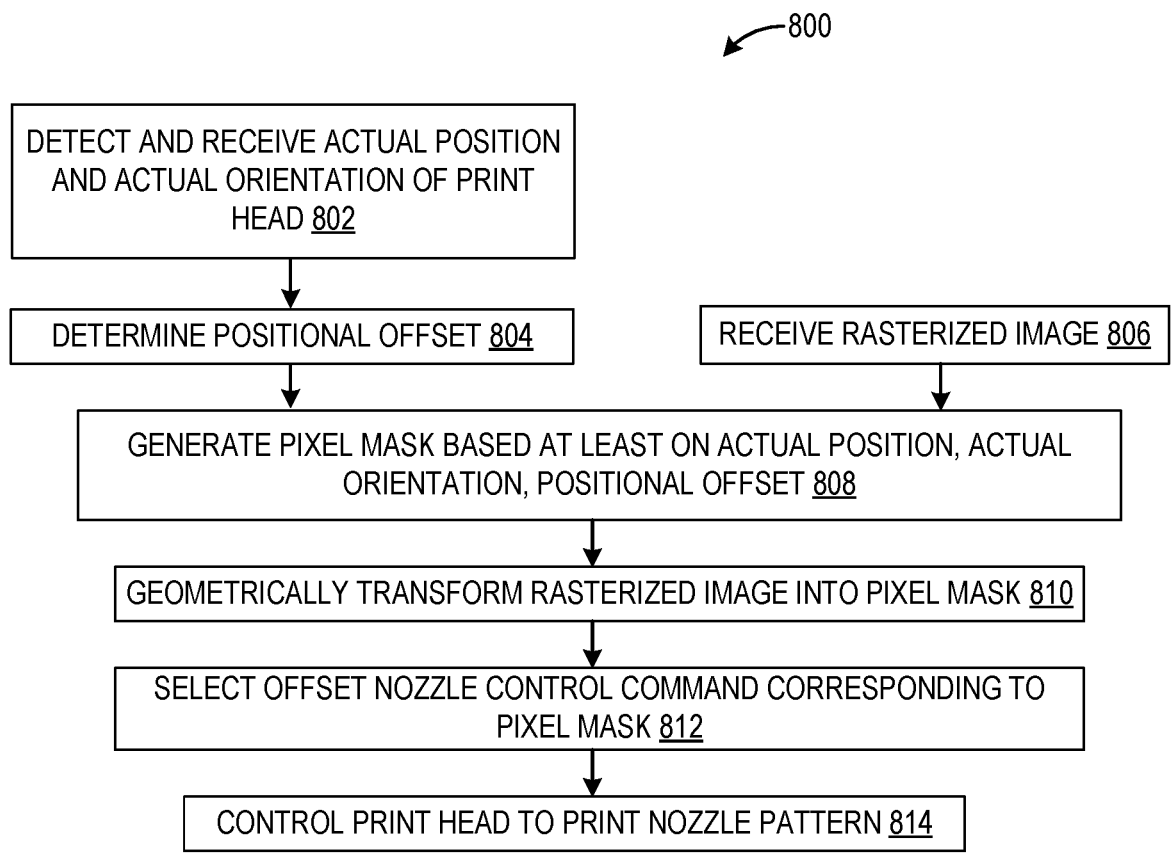
FIG. 17 is a flowchart of a printing method for the printing system according to the fourth example embodiment of the subject disclosure.

In FIG. 17, a method 800 is illustrated for controlling a print head to print a nozzle pattern, according to one example implementation. The following description of method 800 is provided with reference to the software and hardware components described above and shown in FIGS. 1 and 8-10. It will be appreciated that method 800 also can be performed in other contexts using other suitable hardware and software components. At step 802, an actual position and an actual orientation of the print head relative to the substrate are detected and received. At step 804, a positional offset is determined between the actual position and actual orientation and the target print head position and target print head orientation. At step 806, a rasterized image is received.

At step 808, a pixel mask is generated based on the actual position, actual orientation, and the positional offset. At step 810, the rasterized image is geometrically transformed into the pixel mask, each pixel in the pixel mask corresponding to a nozzle of the plurality of ink nozzles. At step 812, an offset nozzle command is selected corresponding to the pixel mask. At step 814, the selected offset nozzle command signal is sent to the print head to control the print head to print the nozzle firing pattern at the target print head position using the plurality of ink nozzles.

Figure 18:
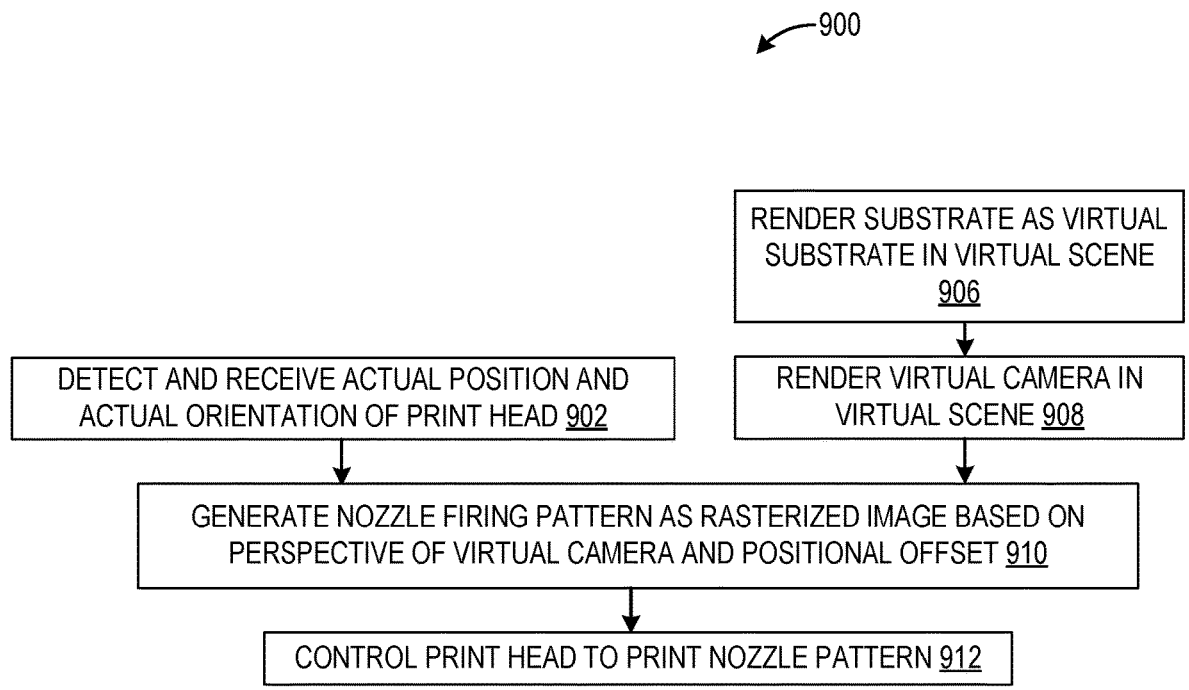
FIG. 18 is a flowchart of a printing method for the printing system according to the fifth example embodiment of the subject disclosure.

In FIG. 18, a method 900 is illustrated for controlling a print head to print a nozzle pattern, according to one example implementation. The following description of method 900 is provided with reference to the software and hardware components described above and shown in FIGS. 1 and 11-13. It will be appreciated that method 900 also can be performed in other contexts using other suitable hardware and software components. At step 902, an actual position and an actual orientation of the print head relative to the substrate are detected and received. At step 906, the substrate is rendered as a virtual substrate in a virtual scene. At step 908, a virtual camera is rendered in the virtual scene at a virtual position and a virtual orientation relative to the virtual substrate corresponding to the actual position and the actual orientation, respectively. At step 910, the nozzle firing pattern is generated as a rasterized image based on a perspective of the virtual camera and the actual position and the actual orientation, such that the nozzle firing pattern accounts for the actual position and the actual orientation. At step 912, the print head is controlled to print the nozzle firing pattern.

The systems and process described herein have the potential benefit of compensating for print misalignments due to vibration and inaccurate controls, thereby increasing print fidelity, print transfer efficiency, and print quality in printing systems. This can result in lowered printing costs and reduced print waste.

Figure 19:
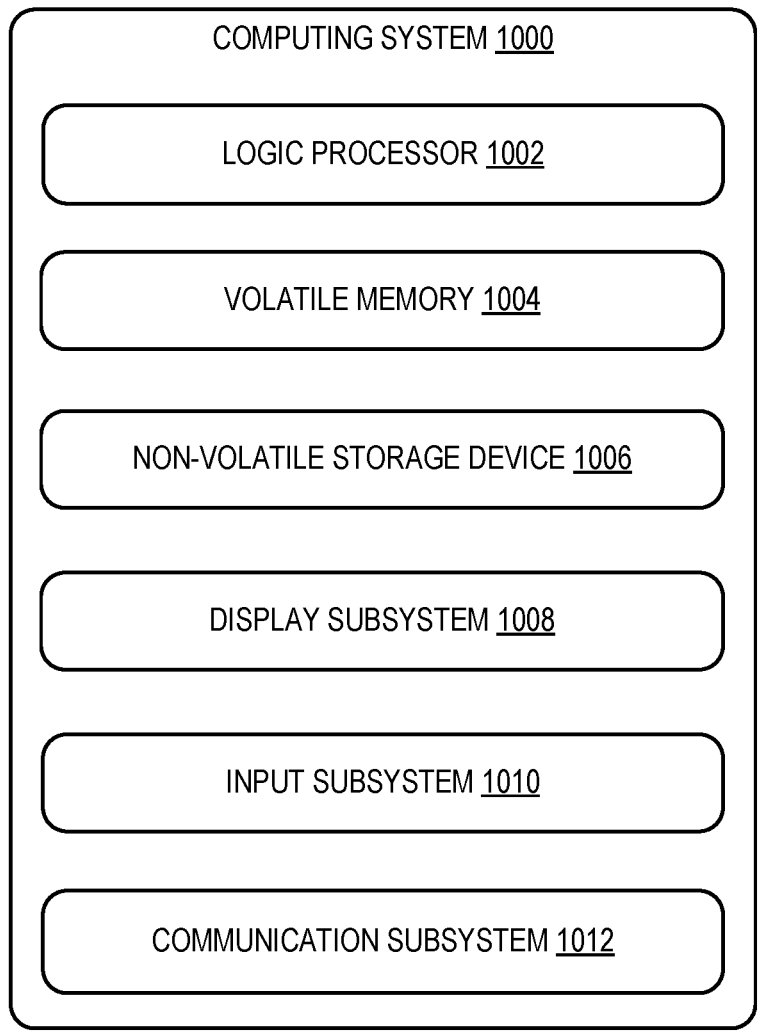
FIG. 19 is a schematic diagram illustrating an exemplary computing system that can be used to implement the printing systems described in the subject disclosure.

FIG. 19 illustrates an exemplary computing system 1000 that can be utilized to implement the computing systems 10, 110, 210, 310, and 410 and the methods 500, 600, 700, 800, and 900 described above. Computing system 1000 includes a logic processor 1002, volatile memory 1004, and a non-volatile storage device 1006. Computing system 1000 can optionally include a display subsystem 1008, input subsystem 1010, communication subsystem 1012 connected to a computer network, and/or other components not shown in FIG. 19. These components are typically connected for data exchange by one or more data buses when integrated into single device, or by a combination of data buses, network data interfaces, and computer networks when integrated into separate devices connected by computer networks.

The non-volatile storage device 1006 stores various instructions, also referred to as software, that are executed by the logic processor 1002. Logic processor 1002 includes one or more physical devices configured to execute the instructions. For example, the logic processor 1002 can be configured to execute instructions that are part of one or more applications, programs, routines, libraries, objects, components, data structures, or other logical constructs. Such instructions can be implemented to perform a task, implement a data type, transform the state of one or more components, achieve a technical effect, or otherwise arrive at a desired result.

The logic processor 1002 can include one or more physical processors (hardware) configured to execute software instructions. Additionally or alternatively, the logic processor 1002 can include one or more hardware logic circuits or firmware devices configured to execute hardware-implemented logic or firmware instructions. Processors of the logic processor 1002 can be single-core or multi-core, and the instructions executed thereon can be configured for sequential, parallel, and/or distributed processing. Individual components of the logic processor 1002 optionally can be distributed among two or more separate devices, which can be remotely located and/or configured for coordinated processing. Aspects of the logic processor 1002 can be virtualized and executed by remotely accessible, networked computing devices configured in a cloud-computing configuration. In such a case, these virtualized aspects are run on different physical logic processors of various different machines, it will be understood.

Non-volatile storage device 1006 includes one or more physical devices configured to hold instructions executable by the logic processors to implement the methods and processes described herein. When such methods and processes are implemented, the state of non-volatile storage device 1006 can be transformed—e.g., to hold different data.

Non-volatile storage device 1006 can include physical devices that are removable and/or built-in. Non-volatile storage device 1006 can include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 1006 can include nonvolatile, dynamic, static, read/write, read-only, sequential-access, location-addressable, file-addressable, and/or content-addressable devices. It will be appreciated that non-volatile storage device 1006 is configured to hold instructions even when power is cut to the non-volatile storage device 1006.

Volatile memory 1004 can include physical devices that include random access memory. Volatile memory 1004 is typically utilized by logic processor 1002 to temporarily store information during processing of software instructions. It will be appreciated that volatile memory 1004 typically does not continue to store instructions when power is cut to the volatile memory 1004.

Aspects of logic processor 1002, volatile memory 1004, and non-volatile storage device 1006 can be integrated together into one or more hardware-logic components. Such hardware-logic components can include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" can be used to describe an aspect of the computing system 10 typically implemented in software by a processor to perform a particular function using portions of volatile memory, which function involves transformative processing that specially configures the processor to perform the function. Thus, a module, program, or engine can be instantiated via logic processor 1002 executing instructions held by non-volatile storage device 1006, using portions of volatile memory 1004. It will be understood that different modules, programs, and/or engines can be instantiated from the same application, service, code block, object, library, routine, API, function, etc. Likewise, the same module, program, and/or engine can be instantiated by different applications, services, code blocks, objects, routines, APIs, functions, etc. The terms "module," "program," and "engine" can encompass individual or groups of executable files, data files, libraries, drivers, scripts, database records, etc.

Display subsystem 1008 typically includes one or more displays, which can be physically integrated with or remote from a device that houses the logic processor 1002. Graphical output of the logic processor executing the instructions described above, such as a graphical user interface, is configured to be displayed on display subsystem 1008.

Input subsystem 1010 typically includes one or more of a keyboard, pointing device (e.g., mouse, trackpad, finger operated pointer), touchscreen, microphone, and camera. Other input devices can also be provided.

Communication subsystem 1012 is configured to communicatively couple various computing devices described herein with each other, and with other devices. Communication subsystem 1012 can include wired and/or wireless communication devices compatible with one or more different communication protocols. As non-limiting examples, the communication subsystem can be configured for communication via a wireless telephone network, or a wired or wireless local- or wide-area network by devices such as a 3G, 4G, 5G, or 6G radio, WIFI card, ethernet network interface card, BLUETOOTH radio, etc. In some embodiments, the communication subsystem can allow computing system 1000 to send and/or receive messages to and/or from other devices via a network such as the Internet. It will be appreciated that one or more of the computer networks via which communication subsystem 1012 is configured to communicate can include security measures such as user identification and authentication, access control, malware detection, enforced encryption, content filtering, etc., and can be coupled to a WAN such as the Internet.

The teachings of the present disclosure have wide uses throughout industry. In one non-limiting example, the printing system 10 is used to move a print head 12 to deposit ink droplets onto a substrate 11 that is an aircraft. In other embodiments, the substrate 11 can be an automobile, a watercraft, a spaceship, a building, or any other suitable substrate capable of being printed on. The printing system 10 can include any number of different controllers, print head sensing system, and image interfaces and processor as disclosed herein. Further, the disclosure comprises configurations according to the following clauses.

The subject disclosure includes all novel and non-obvious combinations and subcombinations of the various features and techniques disclosed herein. The various features and techniques disclosed herein are not necessarily required of all examples of the subject disclosure. Furthermore, the various features and techniques disclosed herein can define patentable subject matter apart from the disclosed examples and can find utility in other implementations not expressly disclosed herein.

To the extent that terms "includes," "including," "has," "contains," and variants thereof are used herein, such terms are intended to be inclusive in a manner similar to the term "comprises" as an open transition word without precluding any additional or other elements.

Further, the disclosure comprises configurations according to the following clauses.

Clause 1. A printing system comprising: a print head including a plurality of ink nozzles; an actuator configured to move the print head relative to a substrate; a print head position sensing system configured to detect an actual position of the print head relative to the substrate; and a controller configured to: receive the actual position of the print head detected by the print head position sensing system corresponding to a target print head position; determine a positional offset between the actual position and the target print head position; generate a nozzle firing pattern based on the positional offset; and control the print head to print the nozzle firing pattern at the target print head position using the plurality of ink nozzles.

Clause 2. The printing system of clause 1, wherein the controller includes a print head controller configured to send a nozzle command signal to the print head to trigger ink ejection of at least one of the plurality of ink nozzles, and the print head controller is configured to: generate the nozzle firing pattern by, at least: intercepting the nozzle command signal; and applying a bit-shift on the nozzle command signal based at least on the determined positional offset to generate a bit-shifted nozzle command signal; and control the print head to print the nozzle firing pattern by, at least: sending the bit-shifted nozzle command signal to the print head to control the print head to print the nozzle firing pattern at the target print head position using the plurality of ink nozzles.

Clause 3. The printing system of clause 1, wherein the controller includes: a print client preprocessor configured to generate the nozzle firing pattern; and a print head controller configured to receive the nozzle firing pattern, in response, send a nozzle command signal to the print head to trigger ink ejection of at least one of the plurality of ink nozzles; the print client preprocessor is further configured to generate the nozzle firing pattern, at least by: identifying a plurality of predetermined candidate positional offsets; generating a respective offset nozzle command for each of the plurality of predetermined candidate positional offsets; and sending each of the respective offset nozzle commands to the print head controller in a nozzle command array; and the print head controller is further configured to control the print head to print the nozzle firing pattern at least by: selecting an offset nozzle command from the nozzle command array based at least on the nozzle command signal and the determined positional offset; and sending the selected offset nozzle command signal to the print head to control the print head to print the nozzle firing pattern at the target print head position using the plurality of ink nozzles.

Clause 4. The printing system any of clauses 1 or 3, wherein the plurality of predetermined candidate positional offsets includes a left shift offset, zero offset, and a right shift offset; and the nozzle command array is stored in a buffer memory of the print head controller.

Clause 5. The printing system of clause 1, wherein the controller includes a print head controller configured to send a nozzle command signal to the print head to trigger ink ejection of at least one of the plurality of ink nozzles; and the print head position sensing system is further configured to detect an actual orientation of the print head relative to the substrate; and the print head controller is further configured to: generate the nozzle firing pattern by, at least: receiving a rasterized image; generating a pixel mask based on the actual position, actual orientation, and the positional offset; and geometrically transforming the rasterized image into the pixel mask, each pixel in the pixel mask corresponding to a nozzle of the plurality of ink nozzles; and control the print head to print the nozzle firing pattern by, at least: selecting an offset nozzle command corresponding to the pixel mask; and sending the selected offset nozzle command signal to the print head to control the print head to print the nozzle firing pattern at the target print head position using the plurality of ink nozzles.

Clause 6. The printing system any of clauses 1 or 5, wherein the pixel mask, comprising a grid of pixel locations, is generated having a tilt and a position corresponding to the actual position and actual orientation; and the rasterized image is geometrically transformed into the pixel mask by superimposing the pixel mask onto the rasterized image, and filling a pixel location of the grid when the pixel location overlaps a filled pixel of the rasterized image.

Clause 7. The printing system of clause 1, further comprising: a print client preprocessor configured to generate the nozzle firing pattern, wherein the controller includes a print head controller configured to send a nozzle command signal to the print head to trigger ink ejection of at least one of the plurality of ink nozzles; the print head position sensing system is further configured to detect an actual orientation of the print head relative to the substrate; the print client preprocessor is configured to receive the actual position and actual orientation of the print head detected by the print head position sensing system; and the print client preprocessor is further configured to generate the nozzle firing pattern, at least by: rendering the substrate as a virtual substrate in a virtual scene; rendering a virtual camera in the virtual scene at a virtual position and a virtual orientation relative to the virtual substrate corresponding to the actual position and the actual orientation, respectively; and generating the nozzle firing pattern as a rasterized image based on a perspective of the virtual camera and the actual position and the actual orientation, such that the nozzle firing pattern accounts for the actual position and the actual orientation; the print head controller is further configured to control the print head to print the nozzle firing pattern.

Clause 8. The printing system any of clauses 1 or 7, wherein the virtual scene, the virtual substrate, and the virtual camera are rendered by mapping the virtual scene, the virtual substrate, and the virtual camera in a virtual three-dimensional coordinate space overlaid upon a real world three-dimensional environment.

Clause 9. The printing system any of clauses 1, 7, or 8, wherein the print client preprocessor comprises a hardware artificial intelligence accelerator configured to render the substrate as the virtual substrate in the virtual scene and render the virtual camera in the virtual scene at the virtual position and the virtual orientation relative to the virtual substrate corresponding to the actual position and the actual orientation.

Clause 10. The printing system of any of clauses 1 to 9, wherein the print head position sensing system comprises an optical camera.

Clause 11. The printing system any of clauses 1 to 10, wherein the print head position sensing system comprises an inertial measurement unit (IMU) disposed on the print head.

Clause 12. A printing method comprising: a print head including a plurality of ink nozzles; an actuator configured to move the print head relative to a substrate; a print head position sensing system configured to detect an actual position of the print head relative to the substrate; and a controller; the printing method comprising: receiving the actual position of the print head detected by the print head position sensing system corresponding to a target print head position; determining a positional offset between the actual position and the target print head position; generating a nozzle firing pattern based on the positional offset; and controlling the print head to print the nozzle firing pattern at the target print head position using the plurality of ink nozzles.

Clause 13. The printing method of clause 12, the method further comprising: generating the nozzle firing pattern by, at least: intercepting a nozzle command signal; and applying a bit-shift on the nozzle command signal based at least on the determined positional offset to generate a bit-shifted nozzle command signal; and controlling the print head to print the nozzle firing pattern by, at least: sending the bit-shifted nozzle command signal to the print head to control the print head to print the nozzle firing pattern at the target print head position using the plurality of ink nozzles.

Clause 14. The printing method of clause 12, wherein the nozzle firing pattern is generated by, at least by: identifying a plurality of predetermined candidate positional offsets; generating a respective offset nozzle command for each of the plurality of predetermined candidate positional offsets; and sending each of the respective offset nozzle commands in a nozzle command array; and the print head is controlled to print the nozzle firing pattern at least by: selecting an offset nozzle command from the nozzle command array based at least on the nozzle command signal and the determined positional offset; and sending the selected offset nozzle command signal to the print head to control the print head to print the nozzle firing pattern at the target print head position using the plurality of ink nozzles.

Clause 15. The printing method any of clauses 12 or 14, wherein the plurality of predetermined candidate positional offsets includes a left shift offset, zero offset, and a right shift offset; and the nozzle command array is stored in a buffer memory of the controller.

Clause 16. The printing method of clause 12, further comprising: detecting an actual orientation of the print head relative to the substrate; generating the nozzle firing pattern by, at least: receiving a rasterized image; generating a pixel mask based on the actual position, actual orientation, and the positional offset; and geometrically transforming the rasterized image into the pixel mask, each pixel in the pixel mask corresponding to a nozzle of the plurality of ink nozzles; and controlling the print head to print the nozzle firing pattern by, at least: selecting an offset nozzle command corresponding to the pixel mask; and sending the selected offset nozzle command signal to the print head to control the print head to print the nozzle firing pattern at the target print head position using the plurality of ink nozzles.

Clause 17. The printing method any of clauses 12 or 16, wherein the pixel mask, comprising a grid of pixel locations, is generated having a tilt and a position corresponding to the actual position and actual orientation; and the rasterized image is geometrically transformed into the pixel mask by superimposing the pixel mask onto the rasterized image, and filling a pixel location of the grid when the pixel location overlaps a filled pixel of the rasterized image.

Clause 18. The printing method of clause 12, further comprising: detecting an actual orientation of the print head relative to the substrate; generating the nozzle firing pattern, at least by: rendering the substrate as a virtual substrate in a virtual scene; rendering a virtual camera in the virtual scene at a virtual position and a virtual orientation relative to the virtual substrate corresponding to the actual position and the actual orientation, respectively; and generating the nozzle firing pattern as a rasterized image based on a perspective of the virtual camera and the actual position and the actual orientation, such that the nozzle firing pattern accounts for the actual position and the actual orientation; and controlling the print head to print the nozzle firing pattern.

Clause 19. The printing method any of clauses 12 or 18, wherein the virtual scene, the virtual substrate, and the virtual camera are rendered by mapping the virtual scene, the virtual substrate, and the virtual camera in a virtual three-dimensional coordinate space overlaid upon a real world three-dimensional environment.

Clause 20. A printing system comprising: a print head including a plurality of ink nozzles; a robotic manipulator configured to move the print head relative to a substrate; an optical camera and an inertial measurement unit (IMU) configured to detect an actual position of the print head relative to the substrate; and a controller configured to, in real-time: receive the actual position of the print head detected by the optical camera and the IMU corresponding to a target print head position; determine a positional offset between the actual position and the target print head position; generate a nozzle firing pattern based on the positional offset; and control the print head to print the nozzle firing pattern at the target print head position using the plurality of ink nozzles.

The invention claimed is:

1. A printing system comprising:
   a print head including a plurality of ink nozzles;
   an actuator configured to move the print head relative to a substrate;
   a print head position sensing system configured to detect an actual position of the print head relative to the substrate; and
   a controller configured to:
      receive the actual position of the print head detected by the print head position sensing system corresponding to a target print head position;
      determine a positional offset between the actual position and the target print head position;
      generate a nozzle firing pattern based on the positional offset; and
      control the print head to print the nozzle firing pattern at the target print head position using the plurality of ink nozzles.

2. The printing system of claim 1, wherein
   the controller includes a print head controller configured to send a nozzle command signal to the print head to trigger ink ejection of at least one of the plurality of ink nozzles, and
   the print head controller is configured to:
      generate the nozzle firing pattern by, at least:

intercepting the nozzle command signal; and
applying a bit-shift on the nozzle command signal based at least on the determined positional offset to generate a bit-shifted nozzle command signal; and
control the print head to print the nozzle firing pattern by, at least:
sending the bit-shifted nozzle command signal to the print head to control the print head to print the nozzle firing pattern at the target print head position using the plurality of ink nozzles.

3. The printing system of claim 1, wherein
the controller includes:
a print client preprocessor configured to generate the nozzle firing pattern; and
a print head controller configured to receive the nozzle firing pattern, in response, send a nozzle command signal to the print head to trigger ink ejection of at least one of the plurality of ink nozzles;
the print client preprocessor is further configured to generate the nozzle firing pattern, at least by:
identifying a plurality of predetermined candidate positional offsets;
generating a respective offset nozzle command for each of the plurality of predetermined candidate positional offsets; and
sending each of the respective offset nozzle commands to the print head controller in a nozzle command array; and
the print head controller is further configured to control the print head to print the nozzle firing pattern at least by:
selecting an offset nozzle command from the nozzle command array based at least on the nozzle command signal and the determined positional offset; and
sending the selected offset nozzle command signal to the print head to control the print head to print the nozzle firing pattern at the target print head position using the plurality of ink nozzles.

4. The printing system of claim 3, wherein
the plurality of predetermined candidate positional offsets includes a left shift offset, zero offset, and a right shift offset; and
the nozzle command array is stored in a buffer memory of the print head controller.

5. The printing system of claim 1, wherein
the controller includes a print head controller configured to send a nozzle command signal to the print head to trigger ink ejection of at least one of the plurality of ink nozzles; and
the print head position sensing system is further configured to detect an actual orientation of the print head relative to the substrate; and
the print head controller is further configured to:
generate the nozzle firing pattern by, at least:
receiving a rasterized image;
generating a pixel mask based on the actual position, actual orientation, and the positional offset; and
geometrically transforming the rasterized image into the pixel mask, each pixel in the pixel mask corresponding to a nozzle of the plurality of ink nozzles; and
control the print head to print the nozzle firing pattern by, at least:
selecting an offset nozzle command corresponding to the pixel mask; and
sending the selected offset nozzle command signal to the print head to control the print head to print the nozzle firing pattern at the target print head position using the plurality of ink nozzles.

6. The printing system of claim 5, wherein
the pixel mask, comprising a grid of pixel locations, is generated having a tilt and a position corresponding to the actual position and actual orientation; and
the rasterized image is geometrically transformed into the pixel mask by superimposing the pixel mask onto the rasterized image, and filling a pixel location of the grid when the pixel location overlaps a filled pixel of the rasterized image.

7. The printing system of claim 1, further comprising:
a print client preprocessor configured to generate the nozzle firing pattern, wherein
the controller includes a print head controller configured to send a nozzle command signal to the print head to trigger ink ejection of at least one of the plurality of ink nozzles;
the print head position sensing system is further configured to detect an actual orientation of the print head relative to the substrate;
the print client preprocessor is configured to receive the actual position and actual orientation of the print head detected by the print head position sensing system; and
the print client preprocessor is further configured to generate the nozzle firing pattern, at least by:
rendering the substrate as a virtual substrate in a virtual scene;
rendering a virtual camera in the virtual scene at a virtual position and a virtual orientation relative to the virtual substrate corresponding to the actual position and the actual orientation, respectively; and
generating the nozzle firing pattern as a rasterized image based on a perspective of the virtual camera and the actual position and the actual orientation, such that the nozzle firing pattern accounts for the actual position and the actual orientation;
the print head controller is further configured to control the print head to print the nozzle firing pattern.

8. The printing system of claim 7, wherein the virtual scene, the virtual substrate, and the virtual camera are rendered by mapping the virtual scene, the virtual substrate, and the virtual camera in a virtual three-dimensional coordinate space overlaid upon a real world three-dimensional environment.

9. The printing system of claim 7, wherein the print client preprocessor comprises a hardware artificial intelligence accelerator configured to render the substrate as the virtual substrate in the virtual scene and render the virtual camera in the virtual scene at the virtual position and the virtual orientation relative to the virtual substrate corresponding to the actual position and the actual orientation.

10. The printing system of claim 1, wherein the print head position sensing system comprises an optical camera.

11. The printing system of claim 1, wherein the print head position sensing system comprises an inertial measurement unit (IMU) disposed on the print head.

12. A printing method comprising: a print head including a plurality of ink nozzles; an actuator configured to move the print head relative to a substrate; a print head position sensing system configured to detect an actual position of the print head relative to the substrate; and a controller; the printing method comprising:

receiving the actual position of the print head detected by the print head position sensing system corresponding to a target print head position;

determining a positional offset between the actual position and the target print head position;

generating a nozzle firing pattern based on the positional offset; and controlling the print head to print the nozzle firing pattern at the target print head position using the plurality of ink nozzles.

13. The printing method of claim 12, the method further comprising:

generating the nozzle firing pattern by, at least:
intercepting a nozzle command signal; and
applying a bit-shift on the nozzle command signal based at least on the determined positional offset to generate a bit-shifted nozzle command signal; and controlling the print head to print the nozzle firing pattern by, at least:
sending the bit-shifted nozzle command signal to the print head to control the print head to print the nozzle firing pattern at the target print head position using the plurality of ink nozzles.

14. The printing method of claim 12, wherein the nozzle firing pattern is generated by, at least by:
identifying a plurality of predetermined candidate positional offsets;
generating a respective offset nozzle command for each of the plurality of predetermined candidate positional offsets; and
sending each of the respective offset nozzle commands in a nozzle command array; and the print head is controlled to print the nozzle firing pattern at least by:
selecting an offset nozzle command from the nozzle command array based at least on the nozzle command signal and the determined positional offset; and
sending the selected offset nozzle command signal to the print head to control the print head to print the nozzle firing pattern at the target print head position using the plurality of ink nozzles.

15. The printing method of claim 14, wherein the plurality of predetermined candidate positional offsets includes a left shift offset, zero offset, and a right shift offset; and the nozzle command array is stored in a buffer memory of the controller.

16. The printing method of claim 12, further comprising:

detecting an actual orientation of the print head relative to the substrate;

generating the nozzle firing pattern by, at least:
receiving a rasterized image;
generating a pixel mask based on the actual position, actual orientation, and the positional offset; and
geometrically transforming the rasterized image into the pixel mask, each pixel in the pixel mask corresponding to a nozzle of the plurality of ink nozzles; and controlling the print head to print the nozzle firing pattern by, at least:
selecting an offset nozzle command corresponding to the pixel mask; and
sending the selected offset nozzle command signal to the print head to control the print head to print the nozzle firing pattern at the target print head position using the plurality of ink nozzles.

17. The printing method of claim 16, wherein the pixel mask, comprising a grid of pixel locations, is generated having a tilt and a position corresponding to the actual position and actual orientation; and the rasterized image is geometrically transformed into the pixel mask by superimposing the pixel mask onto the rasterized image, and filling a pixel location of the grid when the pixel location overlaps a filled pixel of the rasterized image.

18. The printing method of claim 12, further comprising:

detecting an actual orientation of the print head relative to the substrate;

generating the nozzle firing pattern, at least by:
rendering the substrate as a virtual substrate in a virtual scene;
rendering a virtual camera in the virtual scene at a virtual position and a virtual orientation relative to the virtual substrate corresponding to the actual position and the actual orientation, respectively; and
generating the nozzle firing pattern as a rasterized image based on a perspective of the virtual camera and the actual position and the actual orientation, such that the nozzle firing pattern accounts for the actual position and the actual orientation; and controlling the print head to print the nozzle firing pattern.

19. The printing method of claim 18, wherein the virtual scene, the virtual substrate, and the virtual camera are rendered by mapping the virtual scene, the virtual substrate, and the virtual camera in a virtual three-dimensional coordinate space overlaid upon a real world three-dimensional environment.

20. A printing system comprising:

a print head including a plurality of ink nozzles;

a robotic manipulator configured to move the print head relative to a substrate;

an optical camera and an inertial measurement unit (IMU) configured to detect an actual position and an actual orientation of the print head relative to the substrate; and a controller configured to, in real-time:
receive the actual position and the actual orientation of the print head detected by the optical camera and the IMU corresponding to a target print head position and a target print head orientation, respectively;
determine a positional offset between the actual position and the target print head position, and between the actual orientation and the target print head orientation;
generate a nozzle firing pattern based on the positional offset; and
control the print head to print the nozzle firing pattern at the target print head position and the target print head orientation using the plurality of ink nozzles.

* * * * *